Nov. 25, 1941.  W. F. QUINBY  2,264,052
AUTOMATIC QUOTATION SYSTEM
Filed Dec. 21, 1938   9 Sheets-Sheet 1

INVENTOR
W. F. QUINBY
BY *W. F. Presson*
ATTORNEY

Nov. 25, 1941.  W. F. QUINBY  2,264,052
AUTOMATIC QUOTATION SYSTEM
Filed Dec. 21, 1938   9 Sheets-Sheet 3

INVENTOR
W. F. QUINBY
BY
N.F.Presson
ATTORNEY

Nov. 25, 1941.  W. F. QUINBY  2,264,052
AUTOMATIC QUOTATION SYSTEM
Filed Dec. 21, 1938  9 Sheets-Sheet 4

INVENTOR
W. F. QUINBY
BY
ATTORNEY

Nov. 25, 1941.  W. F. QUINBY  2,264,052
AUTOMATIC QUOTATION SYSTEM
Filed Dec. 21, 1938   9 Sheets-Sheet 8

INVENTOR
W. F. QUINBY
BY
ATTORNEY

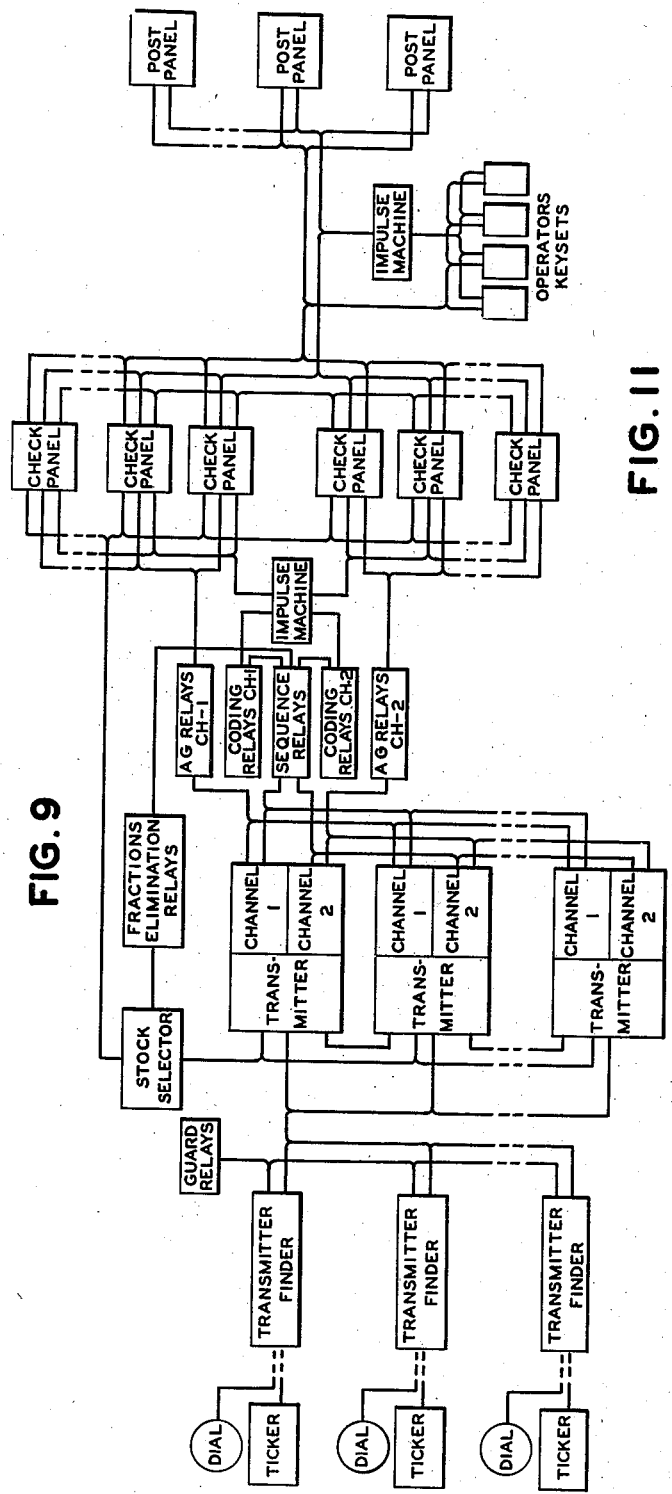

Patented Nov. 25, 1941

2,264,052

UNITED STATES PATENT OFFICE 2,264,052

AUTOMATIC QUOTATION SYSTEM

William F. Quinby, Long Island City, N. Y., assignor to The Teleregister Corporation, New York, N. Y., a corporation of Delaware Application December 21, 1938, Serial No. 247,092
In Canada September 16, 1938

14 Claims. (Cl. 177—353)

This invention relates to improvements in quotation systems in which a subscriber can dial into a central transmitting station, selecting impulses representative of stocks or other items concerning which he wishes information, and automatically receive telegraph impulses for operating a printer or other posting device at the subscriber's station to post and record the current prices or other information in regard to the selected stocks or items.

Systems of this character which have heretofore been proposed have serious disadvantages in that special expensive apparatus would be required, and complicated circuits involving a multitude of connections and duplication of posting and storage devices necessary, and in which expensive and complicated distributor structure would be required for transmitting the necessary signals to the subscribers' stations. Also, the cost of installing such special complicated systems was prohibitive, and the possibility of circuit failures due to the complicated electric circuits required rendered them unsuitable for commercial operation.

One of the objects of the present invention is the provision of an automatic quotation system in which the foregoing disadvantages are obviated, and which is adapted to satisfactorily perform all the functions of the systems heretofore proposed, and in which the circuits employed are relatively simple, with a minimum number of circuits and connections, without substantial duplication of posting and transmitting devices, and which is adapted to employ to a large extent conventional low price telephone and telegraph equipment, and in which the cost of installation and maintenance is comparatively low, and the possibility of circuit failure is reduced to a minimum.

Another object of the invention is to provide a system of the character disclosed in which a relatively simple transmitting distributor structure may be employed, with a small number of segmented transmitting distributor rings, such as two, and in which the necessary movement of the various elements has been reduced to a minimum thereby to minimize wear and breakage of the equipment and obviate the necessity for frequent adjustment of the various parts.

Among the objects of this invention is the provision of suitable mechanism by means of which any one of a large number of subscribers may electrically transmit his request for price quotations on any desired item to a central information bureau to select a group of quotation indicators and actuate the same through a plurality of positions for producing signals which set into operation a transmitting mechanism at the information bureau under control of the selected indicators whereby the transmitter automatically sends back to the calling subscriber telegraphic impulses to operate a printing mechanism at the subscriber's station to cause the printing mechanism to print the designation of the desired item and the price information relative thereto.

Another of the objects of the invention resides in the provision of a plurality of communication channels, each channel being individual to a plurality of groups of storage posting devices representative of a plurality of items, and a mechanism for selecting any of the channels for operation under control of impulses dialed by any subscriber, whereby the posting devices selected by the subscriber within a certain one of the plurality of channels control the transmitting mechanism for causing the prices set up on the selected posting devices to be printed on a tape which issues from a ticker mechanism at the subscriber's station.

Another object of the invention resides in the provision of a transmitting mechanism adapted to transmit information relative to the price of an item wherein the fractions portion of the price transmitted to the subscriber appears in printed form on a printing device at the subscriber's station either as a common fraction or as a decimal in accordance with the manner in which the fractions portion of the price of the item selected is posted at the central transmitting station.

An additional object is to employ the same storage relays for storing integers, common fractions or decimals of a number in one code, and having means associated therewith for transmitting to the subscriber the stored information in one code when the information represents a fraction and in a different code when the information represents either an integer or a decimal.

Another object of the invention is the provision of means for selecting any one of a plurality of assemblies of posting devices for operation either by a calling subscriber or by an operator at a central information bureau, whereby when an operator and a subscriber both attempt to select any of these assemblies simultaneously, the operator has preference over the subscriber, but is prevented from selecting any of the devices during the time that the devices are in use by a subscriber.

Another object resides in the provision of means in the transmitter for rendering a portion of the transmitter available to another subscriber immediately after the impulses corresponding to the item designation have been transmitted to the first subscriber by said portion of the transmitter.

A still further object resides in the combination of circuits and apparatus shown on the drawings, the circuits including a pair of conductors extending from the central information bureau to each subscriber's station, whereby the subscriber sends telegraphic impulses over one of the conductors representative of the designation of an item concerning which he desires information, and means at the central bureau controlled by the subscriber are set into operation for automatically transmitting telegraphic signals over the other of the channels, these signals comprising the item designation dialed by the subscriber and price signals relative thereto.

Another of the objects of the invention resides in the provision of means for causing the automatic release and restoration to normal of a transmitter after it has been seized by a transmitter finder, and in which all the digits of a stock number have not been dialed within a predetermined time, or in which the stock number has been incorrectly dialed.

A still further object resides in the provision of means for automatically releasing a transmitter which has been seized, but not used, or which has been used incompletely.

Another of the objects of the present invention resides in means for automatically releasing and restoring to normal a transmitter in which a number has been stored which is not in accordance with any of the numbers assigned to the stocks or items in reference to which the system is adapted to transmit information.

Another object of the invention resides in the provision of means for providing an indication at an outlying station when an unassigned stock or item number has been dialed from that station.

Another object of the invention is the provision of means for providing an indication at an outlying station when no price information of the item selected by the station has been posted at the central information bureau.

A still further object of the invention resides in the provision of means for posting at the outlying station a signal in accordance with the price information of the selected item posted at the main station, the signal indicating whether the price information includes a bid price only or only an ask price.

Still further objects of the invention will be apparent as the description proceeds.

In order that the invention may be more fully understood, reference will be had to the accompanying drawings, in which:

Figs. 1 to 8 show a circuit diagram of the apparatus at the subscribers' stations and at the central information bureau responsive to impulses dialed by the subscriber for automatically selecting a group of posting devices, thereby to control the operation of transmitting apparatus at the information bureau to record the prices set up on the selected posting devices upon a printing mechanism at the subscriber's station.

Fig. 9 is a diagrammatic representation of the entire system showing a group of operators' keysets for posting prices on indicators of the post and check panels and an arrangement whereby any one of a plurality of subscribers may select the indicators of the check panel for operation over one of a plurality of channels.

Fig. 10 shows the arrangement of the various sheets of drawings comprising the complete system, and Fig. 11 shows a code suitable for use with the system.

Figs. 12 and 13 show devices used in connection with Fig. 2.

The various components of the system and their functions are described and grouped under several headings for convenience in understanding the invention.

The subscriber's dial-ticker unit

Figure 1:
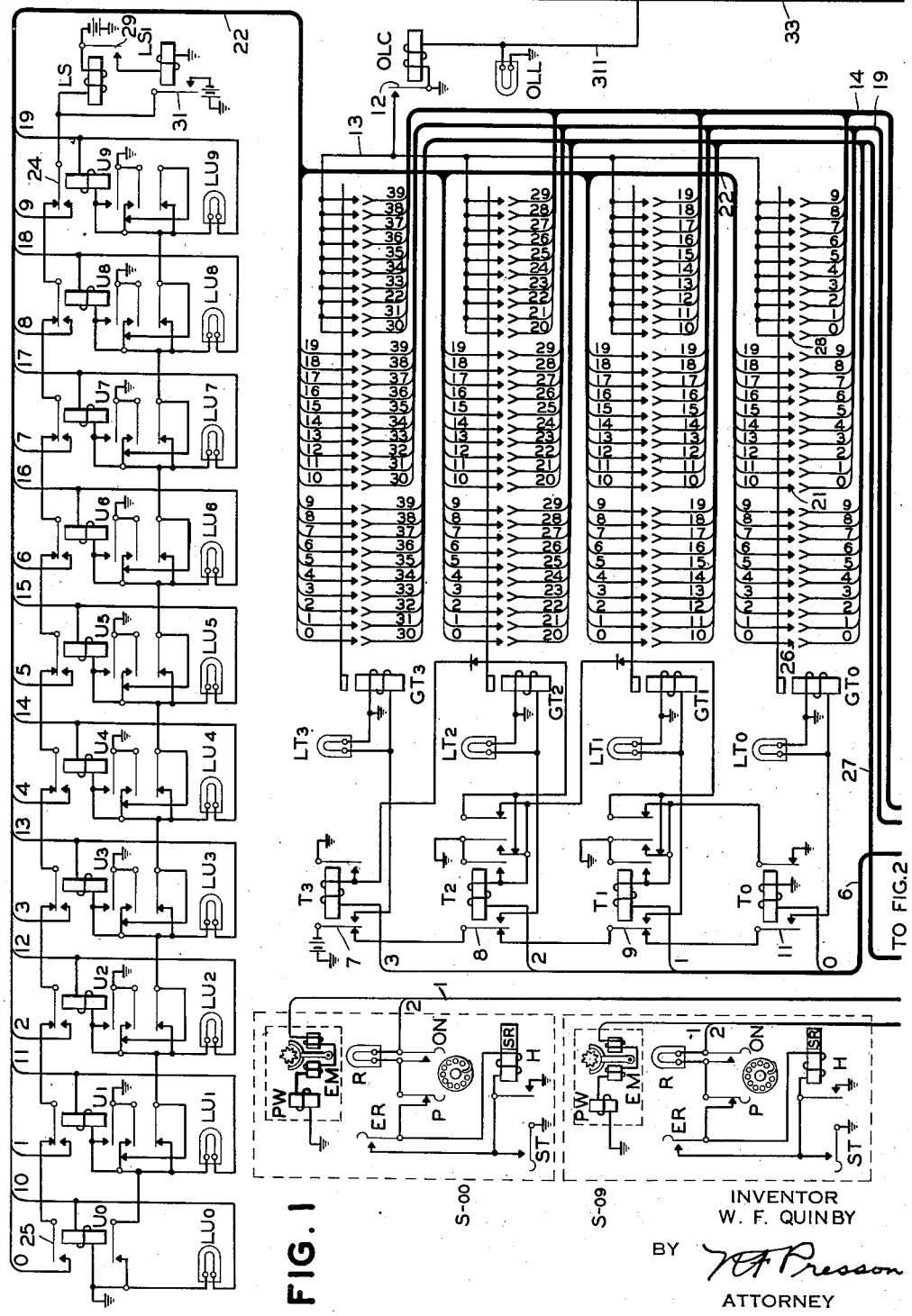
Figure 2:
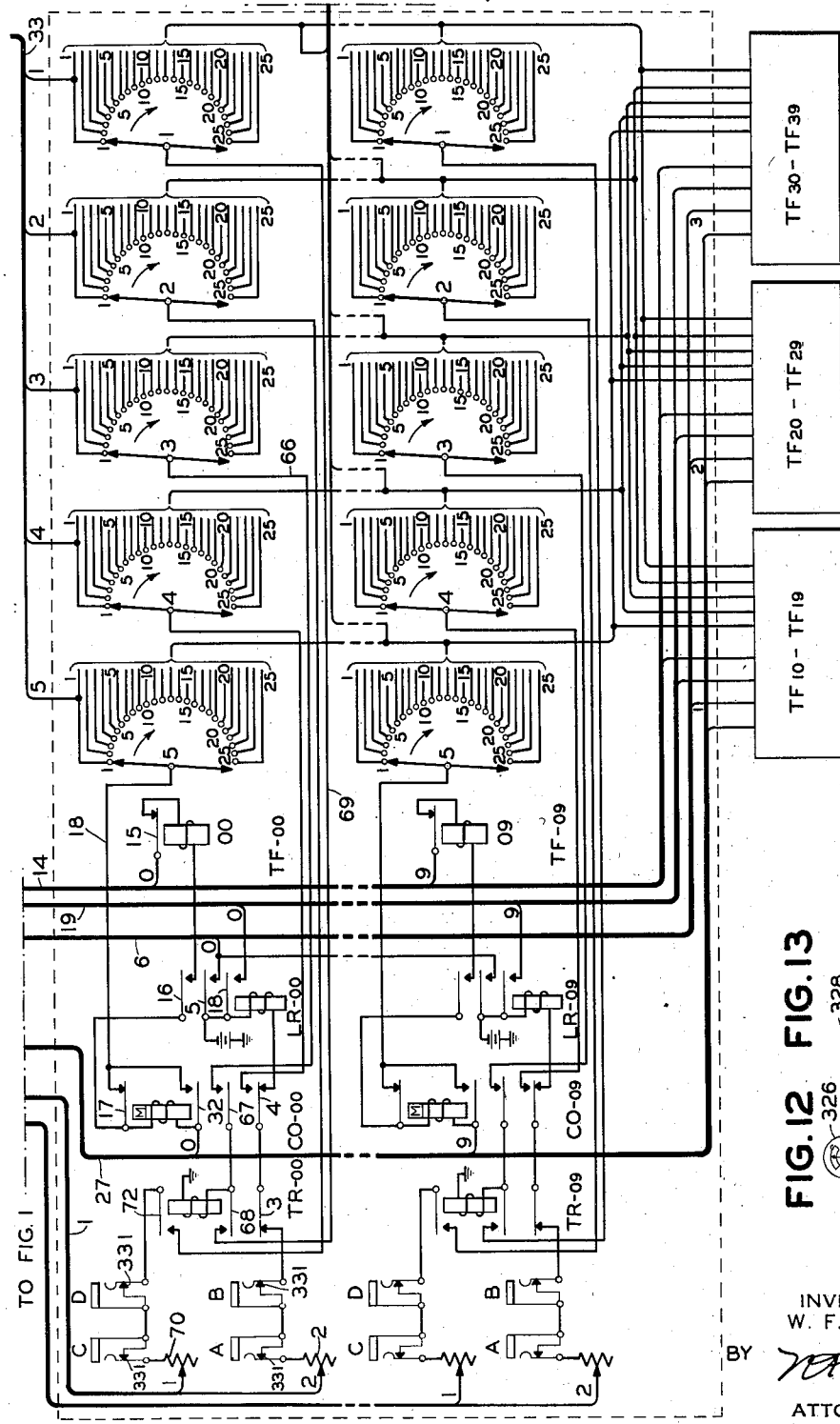

The dial-ticker unit used by the subscribers is shown on Fig. 1 of the drawings and is employed for the purpose of transmitting a request for stock price information and for receiving in printed form on the tape the information requested by the subscriber and a verification of the stock number dialed by the subscriber. Whenever the subscriber makes a request for stock price information, he first depresses the start key ST which connects ground to one of the conductors of the subscriber's line thereby sending a ground impulse to the line equipment associated with his dial-ticker. This ground impulse causes the holding relay H of the dial-ticker set to operate and lock to ground on its own make contact thus maintaining the dial line grounded after the start key has been released. This grounded dial line starts the line equipment hunting for an idle transmitter and, after the idle transmitter has been found, the current flowing through the dial line is increased thereby causing the ready lamp R to light as an indication to the subscriber that an idle transmitter has been connected to his dial line and he may proceed with dialing the number assigned to the stock concerning which he desires information.

Each stock has assigned thereto a number, preferably comprising three digits, thus providing a system having a capacity of 1,000 different stocks. It will be understood, however, that the system may be expanded without the exercise of invention by employing four or more digits for the selection of each stock, the four digit system, for example, having a capacity of 10,000 stocks.

As each digit of the stock number is dialed the movement of the dial from its normal position causes the off normal contacts ON to engage one another and short circuit the lamp R thereby preventing the dial impulses from passing through the lamp. As the dial returns to normal the pulse contacts P are operated in accordance with the digit dialed, thereby causing circuit interruptions or dial pulses corresponding to each of the three digits of the stock number to be stored in the stock number rotary switches of the seized transmitter thereby to select a stock and control the operation of the subscriber's ticker. The holding relay H is a slow-to-release relay and remains operated during the time that the dial pulses are being transmitted.

After the complete stock number has been dialed, the transmitter opens the dial line thereby rendering further manipulation of the dial ineffective until the complete quotation has been printed by the ticker.

The dial ticker is provided with an error key ER which, when operated, shunts the winding of the relay H causing relay H to release and to remove ground from the dial line. The error key is effective in releasing and restoring the transmitter to normal at any time before the last digit of the stock number has been dialed.

After the stock number has been stored in the transmitter, the transmitter sends the stock number back to the subscriber where it is recorded on the dial ticker unit and this is followed by the bid and ask prices of the selected stock which are also recorded on the dial unit. The recording of the stock number and bid and ask prices may be accomplished by any suitable recorder such, for example, as a Burry ticker, shown in U. S. Patent No. 581,411, granted April 27, 1897. The transmitter first sends three print impulses to the ticker which are employed primarily to wind the escapement spring of the ticker. Each print impulse represents a signal having an increase in current over the signals which normally operate the escapement mechanism of the ticker and is of sufficient magnitude to operate the print, wind and stepping mechanism of the ticker.

After three print impulses have been received, the transmitter sends sufficient escapement impulses to the ticker to operate the typewheel thereof for three complete revolutions but the typewheel rotates only until the unison dot (or blank position) on the typewheel is in line with the print hammer at which time the operation of the typewheel is arrested by the unison mechanism thereby insuring that the ticker typewheel is in proper alignment for operation in synchronism with the transmitting distributor as the transmitting distributor subsequently operates.

After the unison impulses have been received, the transmitter sends another impulse to the ticker which releases the unison mechanism so that the escapement may respond to further signals for positioning a selected character of the typewheel in alignment with the print hammer. The selected character is caused to be printed by means of a print impulse received from the transmitter which, in addition to printing the character, causes the tape to be stepped ahead and additional energy to be stored in the ticker spring. It will be understood that the character just referred to represents the first digit of the stock code number. The remaining digits of the stock number are received in like fashion followed by a dot, after which the tens, units and fractions digits of the bid price are printed, then another dot followed by the tens, units and fractions digits of the ask price. After the last digit of the ask price has been printed the transmitter sends four print impulses which cause the last character printed on the tape to be stepped from beneath the typewheel and also rewind the ticker spring so that it will be ready for subsequent operations.

The subscriber lines

Preferably, and as shown, each subscriber's line comprises two channels or conductors extending from the subscriber's dial-ticker unit to a line equipment unit individual thereto and located at a central station. In the embodiment illustrated, one channel or conductor is employed for transmitting impulses to the central station from the subscriber's dial and the other channel or conductor is used to receive telegraph impulses from the transmitter and control the operation of the ticker.

Line equipment unit

One line equipment unit is provided for each subscriber, the unit comprising three relays designated LR, CO and TR and a rotary switch TF. These line equipment units are arranged in groups of ten, the first group comprising units designated 00 to 09, the second group units 10 to 19, the third group units 20 to 29 and the fourth group the units 30 to 39. In the specific embodiment of the invention disclosed on the drawings each group comprises ten line units, each unit being individual to a subscriber and similarly designated. For example, subscriber S—00, Fig. 1, is associated with the line equipment unit TS—00 and the subscriber S—09 is associated with the equipment unit TS—09. Whereas four groups of line units are shown on the drawings, thus providing a system having a capacity of forty subscribers, it will be understood that the system is not necessarily so limited as additional subscribers may be included in the system by merely increasing the number of line equipment groups. The winding of the line relay LR is connected in series with a break contact on each of the associated relays CO and TR in series and operates when ground is applied to the dial line by the operation of the subscriber's start key. The operation of the line relay LR connects the stepping magnet of the associated transmitter finder rotary switch TF to a wiper 5 of the switch. Each contact of the switch TF engaged by the wiper 5 is connected to a transmitter, there being 25 transmitters in the specific arrangement shown in the drawings. The corresponding contacts of the bank 5 of each transmitter finder switch TF are multipled together thereby providing an arrangement whereby all subscribers may have access to all transmitters.

Whenever a transmitter is in use it causes battery potential to be applied to the associated contact of bank 5 of all the switches TF. Should the wiper of bank 5 of a rotary switch be resting on a contact which is connected to battery by a transmitter in use and the relay LR operates, the rotary switch stepping magnet is thereby connected to the wiper 5 and a circuit is completed through the stepping magnet causing the same to be energized by the battery potential on the contact of bank 5. As the stepping magnet operates it causes the operating circuit to be opened at the break contact thereof thus stepping the wipers of the switch ahead to the next set of terminals. If the next contact on the switch bank is also connected to battery the rotary switch will continue to operate and advance the wipers an additional step, the wipers thus advancing by self-interruptions of the rotary switch until the wiper of bank 5 engages a contact which is not connected to battery. The rotary switch having thus found an idle transmitter is brought to rest.

The operation of the line relay LR also extends battery through two of its contacts to the guard relay equipment shown on Fig. 1. When the guard relays operate, battery through the winding of relay LS, Fig. 1, is applied to the winding of relay CO. When the rotary switch wiper engages a contact on bank 5 having no battery connected thereto, relay LS is caused to operate and operate relay LS1 which short circuits the winding of relay LS thereby increasing the current through the relay CO and through the winding of the rotary switch stepping magnet TF. The current passing through the stepping magnet at this time is of sufficiently low value to prevent the operation of the rotary switch but to cause the relay CO to operate. It should be noted that if battery is supplied from the guard relay through the winding of relay LS to the winding of relay CO prior to the rotary switch having come to rest on the contact having no battery thereon, the LS and CO relays are prevented from operating as the opposite side of the circuit is also connected to battery.

The relay CO in operating causes the interruption of the stepping magnet circuit of the rotary switch thus preventing the "busy battery" supplied by the operation of relay CO to the fifth bank contact on which the wiper is resting, from stepping the rotary switch from the seized position. The operation of the relay CO causes the line relay LR to be released and transfers the grounded dial line to the wiper associated with bank 4 of the rotary switch from whence the circuit is continued to the winding of relay A, Fig. 4 of the seized transmitter associated with the terminals on which the wipers of the switch are resting.

The operation of relay A in the transmitter applies "busy battery" to the contact of bank 5 of the rotary switch on which the wipers are now resting thereby locking relay CO and thus preparing a circuit to the winding of relay TR for its subsequent operation by the transmitter through bank 3 of the rotary switch. The relay TR is employed for maintaining the dial line open after relay CO has been released by the transmitter, and for connecting the ticker line through to the transmitter by way of bank 2 of the rotary switch. After relay TR has been operated it locks through its own make contacts through bank 1 of the rotary switch. The release of relay CO causes the release of relay LR and this in turn releases the guard relays which were operated thereby.

*Line guard relays*

The line guard relays are employed for the purpose of preventing two or more line units from seizing the same transmitter. If the start keys of two or more dial-ticker sets associated with any group of line equipment units are operated simultaneously, the transmitter finder switches TF controlled thereby will start hunting for an idle transmitter and, if guard circuits were not provided, two or more switches would come to rest on the first idle transmitter encountered by the switches in their hunting operation. To prevent such a condition, guard circuits are provided, these circuits comprising the plurality of guard relays shown on Fig. 1.

It will be noted that certain contacts of the line relays LR of each group are connected together in parallel and extend to the winding of a tens relay T, Fig. 1, the contacts of the relays LR—00 to LR—09 of group 0 extending to the winding of T0 and the corresponding contacts of the relays LR of groups 1, 2 and 3 extending to the windings of relays T1, T2 and T3 respectively. This circuit arrangement provides for the operation of a particular T relay whenever an LR relay of any group is operated provided the T relay of all the lower numbered groups are unoperated. This may be more readily understood by noting that one end of the winding of each T relay other than relay T0 is connected to ground through a chain circuit which may be interrupted by the operation of any T relay of lower denomination, except the winding of relay T0 which is connected directly to ground. The T relays are thus operated in chain relationship, the chain circuit including contacts on relays T1, T2 and T3 for establishing the locking circuit before the operating circuit of these relays is interrupted at the relay contacts. To avoid the possibility of failure of this circuit due to defective or improperly adjusted contacts of the relays T1, T2 and T3, the contacts of these relays are provided in duplicate and connected together in parallel.

Whenever a relay T is operated, ground is removed by the operation of the relay from the windings of the T relays of higher denominational value, thereby preventing such higher numbered T relays from operating until after the T relays of a lower denominational value have released.

Another chain circuit extends from battery on an armature of relay T3 from whence the circuit is extended through break contacts of lower numbered T relays in series to an armature of relay T0. The operation of any T relay opens this circuit to remove ground from the armatures of lower numbered T relays and the operated T relay of the highest denominational value connects ground from its armature of this chain circuit to the winding of an associated guard relay GT, the operation of relay T3 causing the guard relay GT3 to operate and the operation of relays G2, G1 and G0 in like manner causing the guard relays GT2, GT1 and GT0 respectively to operate provided the T relays of higher denominational value are released.

From the foregoing description it will be obvious that if a T relay is operated and caused the operation of its associated GT relay, the subsequent operation of any or all T relays of lower value will not be effective to operate their associated GT relays, as the first T relay has opened the chain circuit at its break contacts thus preventing battery from being applied to the contacts of the T relays of lower denominational value. As previously stated, the first operated T relay prevents the operation of any T relay of higher denomination thereby preventing the operation of the chain circuit which at the closed contacts of the first operated T relay caused the operation of the associated GT relay.

The method of designating the groups of ten line units will now be explained. The designation of each line unit comprises two or more digits, the last of which indicates the unit within the group of line units, for example, the designation 00 indicates the 0 unit in the 0 group and the designation 115 would indicate the fifth unit in the eleventh group.

Whenever a GT relay operates, battery through the winding of relay LS is connected to the winding of the associated CO relay thereby causing the relay LS to operate in series with the associated stepping magnet TF to ground through the interrupter springs of the stepping switch. The operation of relay LS causes relay LS1 to operate thereby increasing the current in the circuit just mentioned and causing the relay CO to operate after it has received battery from the guard relay circuit and the wipers of the line rotary switch TF have engaged a set of terminals corresponding to an idle transmitter which does not connect battery to the terminal of bank 5.

*The transmitting apparatus*

The transmitting apparatus preferably comprises a plurality of transmitters, indicated on the drawings as a group of twenty-five transmitters although it will be understood that it may comprise but a single transmitter. A complete transmitter TR1 is shown on Figs. 3, 4 and 5 of the drawings, Fig. 4, also showing in diagrammatic form the other transmitters TR2 to TR25 of this group. The number of transmitters employed in the system will depend upon the number of subscribers and the rate at which the subscribers dial their requests and sufficient transmitters will usually be employed to prevent an appreciable delay in the transmission of the requested stock information to the subscriber.

Each transmitter is connected to the transmitter finder switches TF by five conductors connected to the five switch banks so as to be engaged by the wipers when the switch has taken the proper setting. The lines which connect the bank 5 of the rotary switches TF are employed for indicating that the transmitter connected thereto is busy when battery is applied to the contact of bank 5, thus preventing any other rotary switch from seizing the transmitter during the time the transmitter is in use. The conductors connected to bank 4 of the switches are employed for extending the dial line to the transmitters after the relay CO has operated, thus establishing a connection for the operation of relay A of the seized transmitter under control of the subscriber's dial. Bank 3 of each of the rotary switches is employed for connecting the winding of relay TR to the transmitter in order that the relay may be subsequently operated by the transmitter, and the conductor connected to bank 1 of each of the switches is used for completing a locking circuit for the relay TR through operated contacts thereof. The conductors connected to bank 2 of each of the switches are employed for connecting the ticker line to the transmitter.

After the relay CO of the line unit has been operated by the seized transmitter, the winding of relay A of the transmitter is connected to the dial line conductor through the ready lamp R of the subscriber's dial ticker set to ground, causing the lamp R to be lighted as an indication to the subscriber that he may proceed with dialing a stock number.

Figure 5:
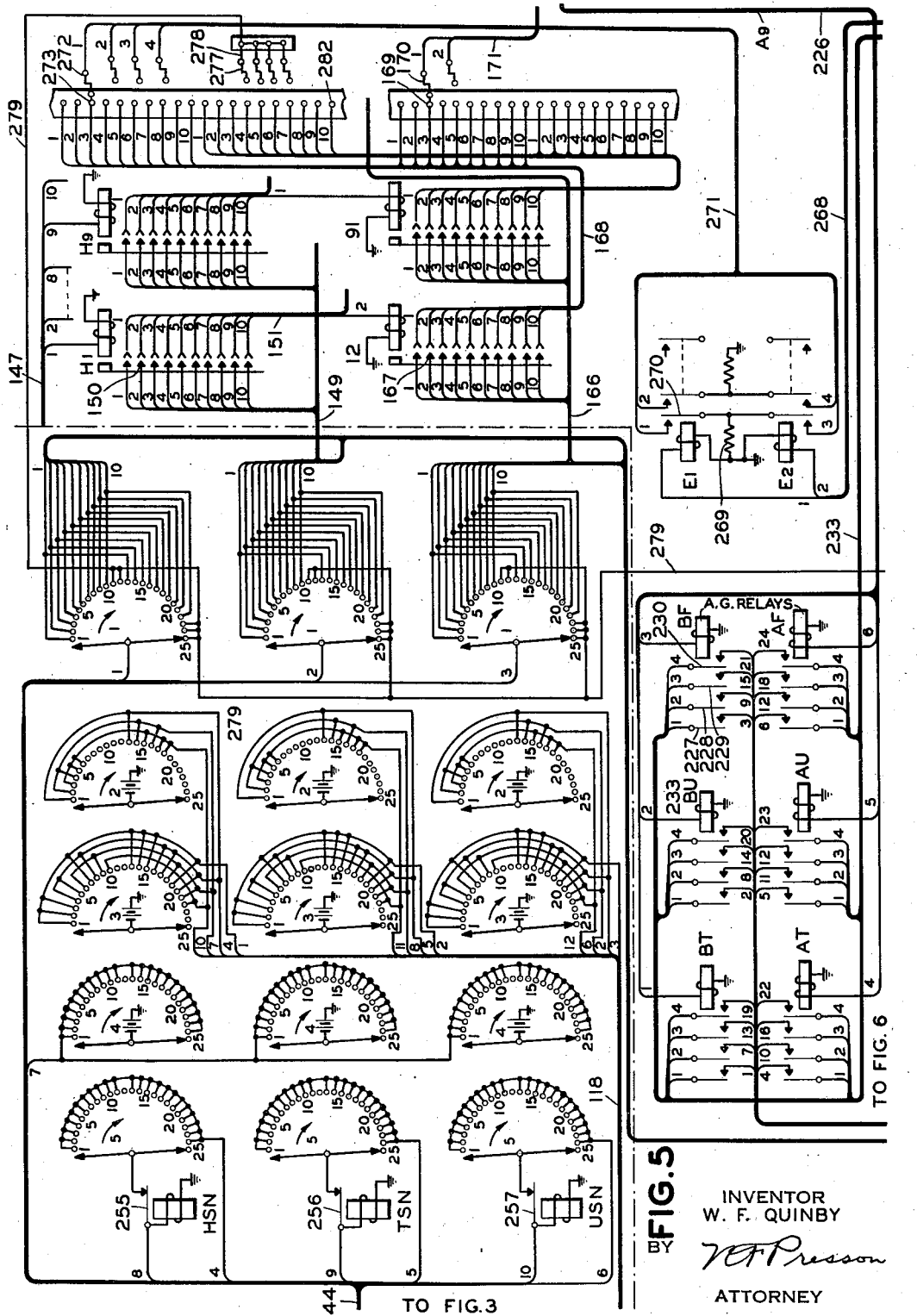

During the dialing operation the relay A is pulsed in synchronism with the dial impulses thereby causing the stock number rotary switches of Fig. 5 to operate and store the digits of the stock number dialed, the hundreds digit being stored in the switch HSN and the tens and units digits in the switches TSN and USN respectively.

Figure 4:
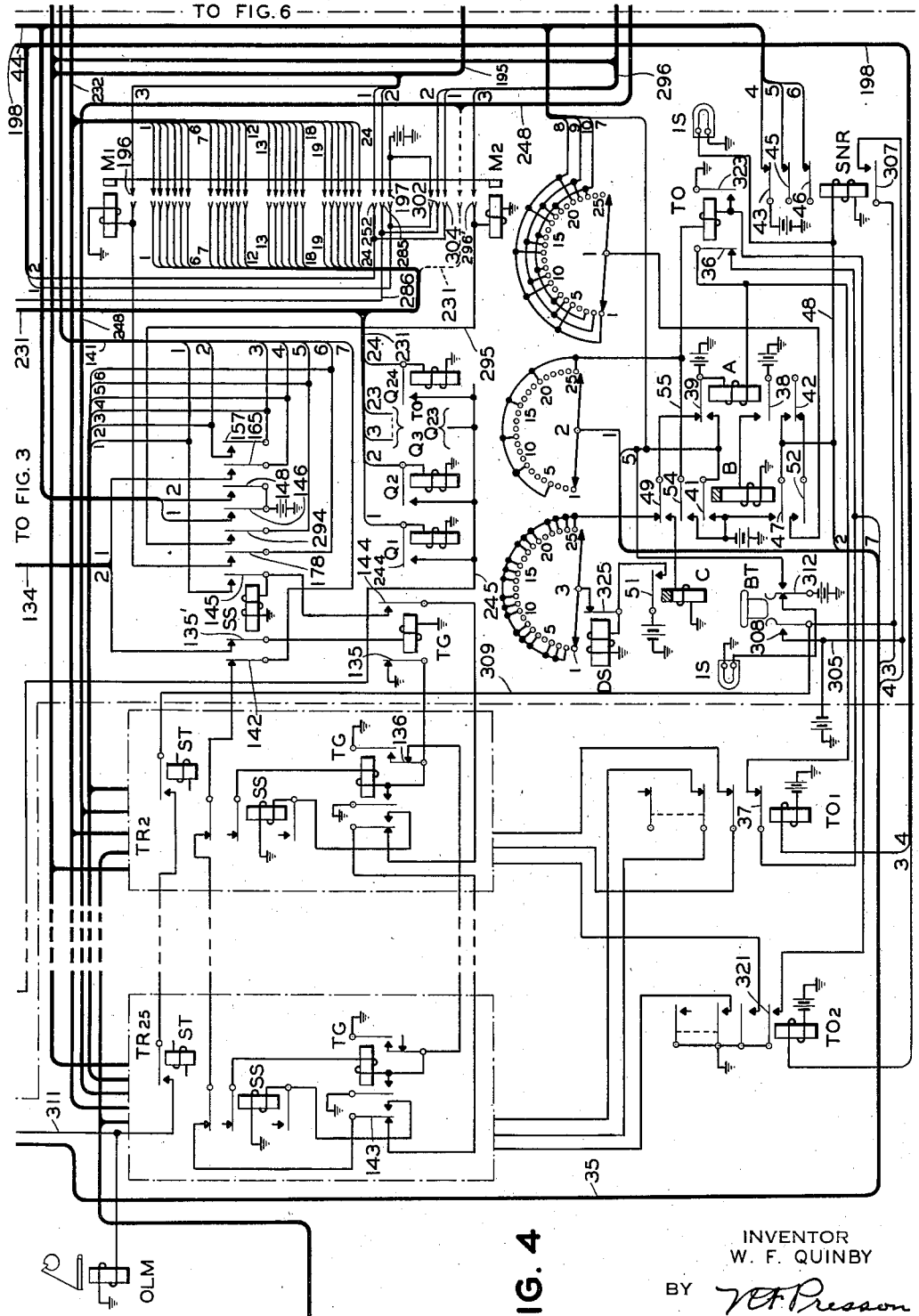

During the time that dial impulses for the hundreds digit of the stock number are received, the dial sequence switch DS, Fig. 4, is in the position shown on the drawings with the switch HSN connected to wiper 1 thereof, whereby the first set of dialed impulses operate the switch HSN. After the first set of impulses have been received the switch DS is advanced one step, the wiper 1 now engaging a contact connected to the switch TSN so that the second set of dial impulses is stored on the switch TSN. Similarly the advancement of the switch DS to the next set of terminals after the second digit has been dialed causes the wiper 1 to be connected to the switch USN thereby to store the third digit of the stock number therein.

Figure 3:
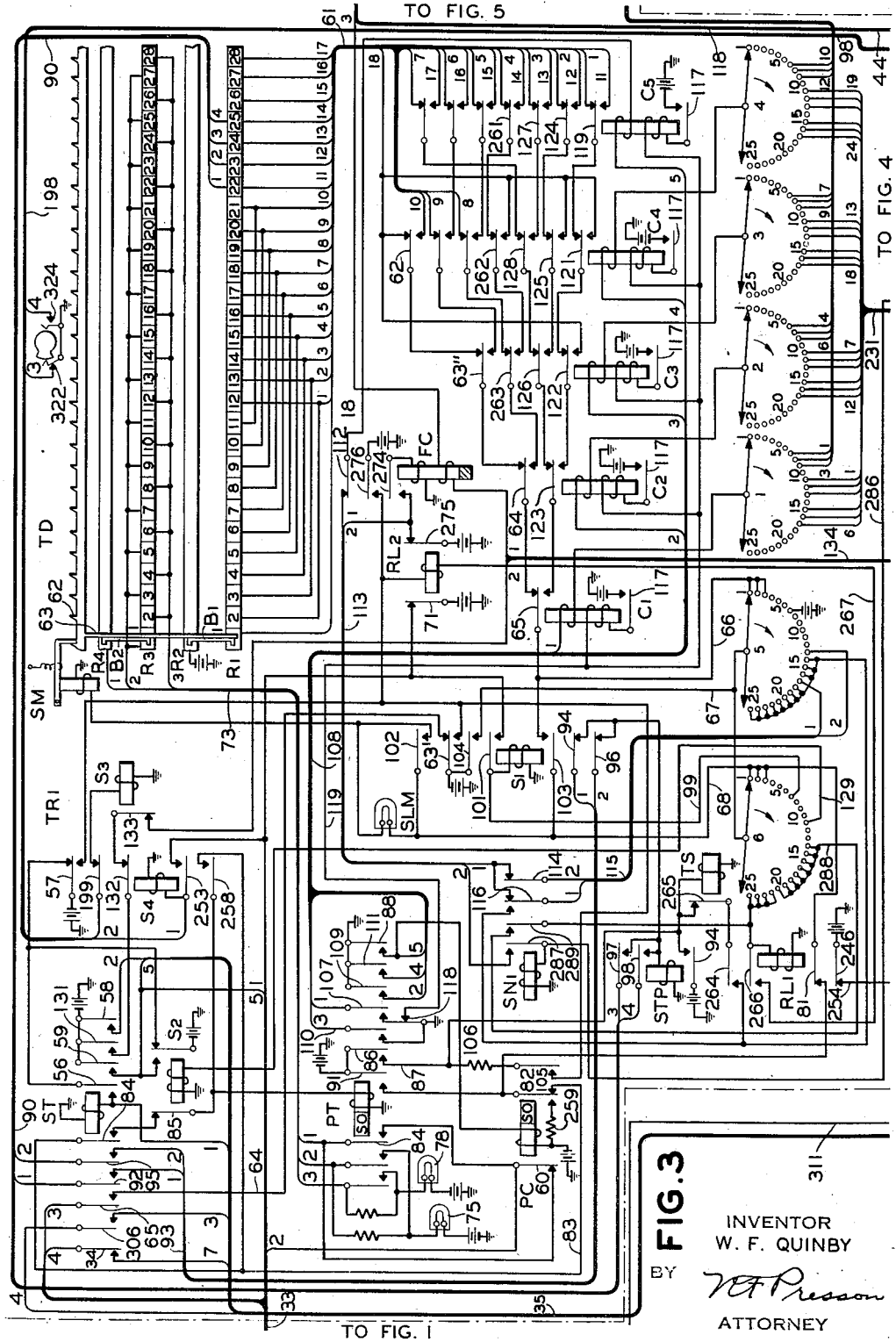

After the three digits of a stock number have been stored in the transmitter, the dial sequence rotary switch DS steps to the fourth set of terminals and causes the operation of start relay ST, Fig. 3, which opens the dial line and thus prevents the subscriber from interfering with the operation of the transmitter by further manipulation of his dial.

Upon operation of the relay ST the ticker sequence switch TS is set into operation by the print and print cut-off relays PT and PC respectively which are controlled by relay ST and the blank segment 1 of the transmitting distributor. Each time the relays PT and PC operate, the ticker sequence rotary switch TS is advanced one step and the current flowing in the ticker line is increased to cause the ticker to print, and more particularly at this time to wind the spring of the ticker. As the switch TS is advanced step-by-step it causes a predetermined number of print impulses to be transmitted after which it causes the ticker distributor to rotate by releasing the stop magnet SM thereof, thereby transmitting a series of impulses to the ticker for bringing it in unison with the transmitting distributor, after which an additional impulse is transmitted for releasing the unison mechanism of the ticker and storing additional energy in the escapement drive spring. After this occurs the stock number is transmitted to the subscriber's ticker. This is accomplished by the three stock number rotary switches HSN, TSN and USN which are connected in succession by the operation of the switch TS to a group of coding relays C1 to C5, Fig. 3. Banks 2 and 3 of each of the stock number rotary switches are connected to an associated group of four wires which have battery connected to them in a code combination in accordance with the settings of the switch wipers.

When the wipers of the switch TS are resting on contact number 1, for example, the four code wires from the switch HSN are connected thereto and the circuit comprising these wires is extended to the windings of the relays C1 to C4 which, after relay PT has operated, are caused to operate in accordance with the code set up by the particular set of contacts upon which the wipers of the switch HSN are resting. Relays C1 to C4 and C5 have their contacts so connected that for every different code setting, a circuit will be extended from the armature of relay C1 to a particular wire in the group of 18 wires extending to individual segments on the control ring R1 of the transmitting distributor TD. Each code setting and each segment corresponding thereto represents a particular digit or character to be printed by the ticker.

When the coding relays have taken their settings, a circuit is completed to the segment of the control ring R1 which corresponds to the character to be printed and the distributor brush is caused to be stopped on that segment by this circuit, thus interrupting the transmission of ticker signals and causing the ticker typewheel to come to rest. After this occurs, the current flowing in the ticker line is increased thereby causing the ticker to print the selected character, the wipers of the switch TS then advancing to the next set of terminals to cause the succeeding character to be transmitted and printed.

As the switch TS continues its operation it causes relay S1 to operate and connect the common circuit originating at the armature of relay C1 of the coding relays C1 to C4, directly to contacts of controlling relays whereas it has been previously so connected through the wipers of the switch TS. After the switch TS has stepped past the contacts controlling the stock number, the relay S2 is operated as an indication that the transmission of the stock number has been completed and that the signals corresponding to the Bid and Ask prices of the stock may be sent.

At the time that relay ST was first operated, the transmitter guard relay TG, Fig. 4, was operated as an indication that a stock price was to be obtained from the quotation board. One guard relay TG is provided for each transmitter and all the guard relays are connected together in consecutive chain relationship in such a manner that only one transmitter may have access at any time to that portion of the equipment which selects a stock. In the specific arrangement shown, the transmitter TR1 or any other transmitter, the start relay ST of which has been operated, is the first to have access to the selection equipment. The interconnections between the guard relays TG are similar to those employed with the line equipment, i. e., when one TG relay is operated another of a higher number cannot be operated until the lower numbered one has been released and when one of a lower number operates after a higher numbered one has operated, the higher numbered one is not effected as the control circuits are cut off from the lower numbered relays by the operation of the highest numbered relay. After the transmitter guard relay TG has operated at a time when no other stock selection relay SS of any other transmitter is operated, the SS relay of the transmitter having the operated guard relay is caused to operate and select a gang relay in the quotation room check board by means of a stock selector. The selection of the gang relay is controlled by the settings of the stock number rotary switches HSN, TSN and USN.

Figure 6:
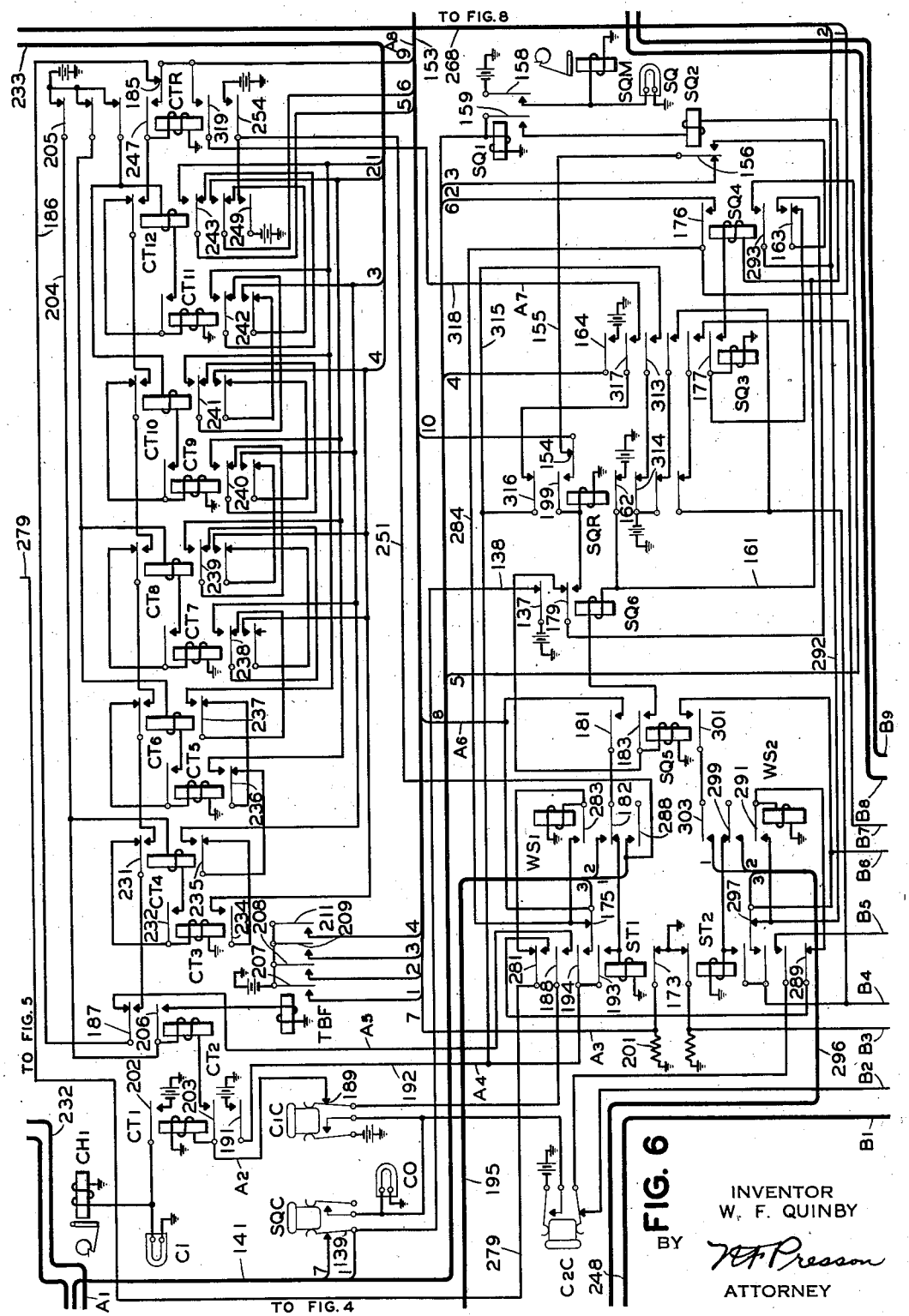

When the relay SS operated, it set into operation the set of sequence relays SQ of Fig. 6, which sequence relays is common to all of the transmitters. This set of sequence relays is controlled by impulses generated by an impulse machine whereby the operation of the sequence relays is timed. The function of the sequence relay counting chain during its first cycle of operation is to cause the operation of a selected gang relay in the quotation board after which it causes the operation of the multiple relay M1 or M2 in the transmitter for receiving the price codes and then operates either one or the other of the channel start relays ST1 or ST2 in accordance with the channel of the selected stock, as the case may be.

The stock indicators are divided into two groups designated channel 1 and channel 2, which provides an arrangement whereby two prices may be obtained concurrently from the indicators of different channels.

When relay ST1 or ST2 of the sequence group operates, it causes a group of counting relays CT1 to CT12, Fig. 6, associated therewith to be set in operation which counts eleven impulses for operating the indicators of the selected stock through one complete rotation. The actuating ground lead of each indicator unit is connected in series with a relay which operates when the indicator is being stepped from the blank or normal position. These relays are arranged in a plurality of groups, there being one group for the tens, units and fractions indicators of the bid prices and another group for the tens, units and fractions indicators of the ask prices, each group comprising twelve relays divided into three subgroups of four relays each, there being as many sub-groups as there are digits in the prices to be transmitted. These relays are shown on Fig. 4 of the drawings and designated Q1 to Q24. The particular time during the cycle of operations at which these Q relays operate in relation to the operation of the coding relays causes a code in accordance with the indication setting to be stored in storage relays of the transmitter. After the counting relays have completed their cycle of operation the release relay CTR, Fig. 6, causes them to release and at the same time releases the selected gang relay in the indicator board, the operated multiple relay in the transmitter and the transmitter start relay ST1 or ST2, as the case may be.

When the multiple relay in the transmitter operated, relay S3, Fig. 3, was operated thereby interrupting the operating path of the transmitter guard relay TG to prevent its further operation during the transmission of signals to the ticker for the selected stock. When the price has been obtained from the indicators the operation of relay CTR, Fig. 6, causes the operation of relay S4, which signals the transmitter that the price information is now available whereupon the transmitter, which has by this time transmitted the dialed stock number to the subscriber, is again set in operation to transmit the bid and ask quotations.

When a start relay ST1 or ST2 of the sequence group has operated during the process of obtaining the price of a stock from the indicators, a resistance unit is cut into the common circuit of all of the gang relays of the channel corresponding to the operated start relay. This resistance is of such value that sufficient current is maintained in the circuit for maintaining a gang relay operated, but the current is of insufficient value to enable a second gang relay to be operated in parallel with the first gang relay, thereby preventing the operation of more than one gang relay of the same channel at the same time.

The operation of this feature will best be understood by consideration of a specific example. Assume, for instance, that the equipment is in the process of obtaining the price from the indicators of a channel 1 stock and that the price of another, or the same channel 1, stock is desired at the same time. When the sequence relays are set in operation for the second time in connection with the selection of the second stock gang relay, the second gang relay is incapable of operation due to the reduced current resulting from the high resistance cut into the circuit by the operation of relay ST1. The multiple relay of the second transmitter, therefore, remains unoperated and the S3 relay of the transmitter is also unoperated thus making the guard relay TG effective to again condition the circuit whereby operation of the relay TG may cause the relay SS to operate and the sequence relays to make a second attempt to operate the second gang relay. After the first gang relay has been released the second one may be operated in the manner just described and the subsequent attempts of other relays to operate will be unsuccessful until after the second relay has released.

Whereas the foregoing description of the transmitter relates to the posting of the stock prices in dollars and eighths of dollars, the system is also adapted to post prices of stocks in dollars and cents. This is accomplished by eliminating the fraction digit and substituting therefor a numeral in the third or lower denominational value of the bid and ask prices. This feature is provided by the fractions elimination relays BT, BU, BF and AT, AU, AF, Fig. 5, and the fractions cut-off relay FC, Fig. 3, associated with each transmitter.

When it is desired to display a stock in dollars and cents, a cross section of the fractions elimination equipment is connected in parallel with the stock selection lead of the stock. The operation of the fractions elimination relays causes a resistance to be connected to the stock selection lead thereby increasing the current in the stock selection lead to a value sufficiently high to cause the operation of the fractions cut-off relay FC connected in series therewith. The relay FC is a marginal relay and operates only when this resistance has been connected to the stock selection lead. The operation of the relay FC prevents the operation of relay C5 in the transmitter thereby preventing the printing of fractions characters by the ticker and causing the ticker to print the desired integers in their places.

The stock selector

The stock selector is employed for selecting any one of the stocks on the quotation board in accordance with a stock number dialed and stored in the stock number switches HSN, TSN and USN. When relay SS, Fig. 4, in a transmitter operates, battery is applied to the wipers of bank 1 of the three stock number rotary switches, the wiper 1 of the switch HSN causing one of the hundreds stock number relays H1 to H10 to operate in accordance with the settings of the wipers. Each of the hundreds stock number relays is provided with 10 make contacts, multipled to a corresponding contact of the other hundreds stock number relays and to the contacts of bank 1 of the switch TSN. Whenever any one of the relays H1 to H10 operates a corresponding group of ten tens stock number relays is connected to the terminals of bank 1 of the switch TSN. Each of the tens stock number relays is provided with ten contacts multipled together and to the terminals of bank 1 of the switch USN, the companion contacts of each of the tens stock number relays being connected to individual pin jacks. The gang relays of the quotation board are connected to individual plugs adapted to engage the pin jacks.

From the foregoing description it will be apparent that when battery is applied to the wipers 1 of switches HSN, TSN and USN, the hundreds stock number relay will be operated in accordance with the setting of the switch HSN and connect ten tens stock number relays to the contacts of bank 1 of the switch TSN. Battery from the wiper 1 of the switch TSN is extended through one of the contacts of the operated hundreds stock number relays to the winding of a particular tens stock number relay, thereby causing the tens stock number relay to operate in accordance with the settings of the switches HSN and TSN. The operated tens stock number relay completes a circuit from ten of the pin jacks to the terminals of bank 1 of switch USN whereby battery on wiper 1 thereof is extended from a particular terminal of bank 1 through one of the contacts of the operated tens stock number relay to one of the pin jacks from whence the circuit is continued through the pin plug inserted therein to the winding of a stock selection gang relay, causing the operation of the gang relay, thereby to select the indicators of a desired stock for operation.

The time out relays

The time out relays TO1 and TO2, Fig. 4, are provided to automatically cause the release of any transmitter which has been seized but not used within a predetermined period of time. When relay B of the transmitter is operated, battery is connected to the winding of relay TO, the other end of the winding being connected to a contact on the relay T2 which closes under control of an interrupter substantially each half second. When relay TO operates and if the transmitter has not been used, the relay TO1 operates thereby opening the dial line and causing the release of the holding relay H in the ticker set and the release of relay A in the transmitter. This cycle of operations causes the release and restoration to normal of the transmitter as will hereinafter be described in greater detail.

Detailed operation of the system

The operation of the system will best be understood by consideration of a specific request for stock information. Assume, by way of example, that the subscriber S—00 desires information regarding the stock Dome Mines, the code number of which is 123 and the indicators of this stock have previously taken settings corresponding to a bid price of 40 and an ask price of 41½.

The start key ST of the dial-ticker is operated thereby connecting ground at the start key to the winding of the holding relay H from whence the circuit is continued through the pulse contact P of the dial, the lamp R, the dial line indicated as conductor 2 of cable 1, the compensating resistance 2, the line jacks A and B, break contact and armature 3 of relay TR—00, armature 4 and break contact of relay CO—00, winding of relay LR—00 and thence to battery. The relay LR—00 operates over the circuit just traced and connects battery at its armature 5 and make contact thereof to the 0 conductor of cable 6 and thence to the winding of the tens guard relay TO, Fig. 1, causing relay TO to operate.

The operation of relay TO completed the circuit from battery at armature 7 of relay T3 and break contact, armature 8 of relay T2 and break contact, armature 9 and break contact of relay T1, armature 11 and make contact of relay TO to the winding of relay GTO and thence to ground causing relay GTO to operate and the lamp LTO to be lighted. The operation of relay GTO completed a circuit from ground at armature 12 and break contact of relay OLC, conductor 13, operated contacts of relay GTO, conductors 0 to 9 of cable 14, of which the grounded conductor 0 is extended to armature 15 and break contact and winding of the line rotary switch stepping magnet 00, make contact and armature 16 of relay LR—00, armature 17 and break contact of relay CO—00, conductor 18, wiper 5 of the rotary switch TF—00 to the bank terminal on which the wiper is resting. If the wipers of the switch TF—00 are resting on a set of terminals associated with a busy transmitter, battery is supplied by the transmitter to the terminal of bank 5 causing the stepping magnet 00 to be energized and attract its armature 15, thereby interrupting the operating circuit of the stepping magnet and causing it to release and advance the switch wipers to the next set of terminals. Should the next terminal of bank 5 have battery thereon, the switch will continue to step by self interruptions until a terminal of bank 5 is encountered by the wiper which has no battery connected thereto and the wipers of the switch then come to rest in engagement with this set of terminals. Should the first set of terminals upon which the wipers are resting be associated with a transmitter which is not busy, the switch TF—00 will not step, but the wipers will remain connected to the idle transmitter.

When the line relay LR—00 operated, battery at the armature 18 of relay LR—00 and make contact thereof was placed on conductor 0 of cable 19 from whence the circuit is continued through the operated contacts 21 of relay GTO, conductor 10 of cable 22 to the winding of relay UO and thence to ground, causing relay UO to operate and the lamp LUO to light in parallel therewith. The operation of relay UO closed a circuit from battery through the winding of relay LS and the armatures 24 and break contacts of relays U9 to U1 in series, armature 25 and make contact of relay UO, conductor 0 of cable 22, operated contacts 26 of relay GTO, conductor 0 of cable 27 through the winding of the marginal relay CO—00, thence to the armature 16 and make contact of relay LR—00, the winding of the stepping magnet 00 of the switch TF—00, break contact and armature 15 of the stepping magnet, conductor 0 of cable 14, contact 28 of relay GTO, conductor 13 to ground at the armature 12 of relay OLC. The relay CO—00 is prevented from operation by battery on the wiper 5 of the switch TF—00, conductor 18, break contact and armature 17 of relay CO—00. As long as wiper 5 of the switch TF—00 is contacting bank terminals whereon there is battery, relays CO and LS cannot operate as there is battery at both ends of the circuit of like polarity. However, when the switch TF—00 has stepped to an idle terminal having no battery thereon, ground through the stepping magnet and armature 16 of relay LR—00 is applied through the winding of relay CO—00 to the winding of relay LS, thereby causing the operation of relay LS. Relay CO, being marginal, does not operate at this time as the resistance of the winding of the relay LS is sufficient to reduce the current through the winding of relay CO sufficiently to prevent its operation.

Relay LS in operating moves its armature 29 into engagement with the contact thereof and operates relay LS1. When armature 31 of relay LS1 engages its make contact, the winding of relay LS is shorted out and the current through the winding of relay CO is thereby increased sufficiently to cause relay CO to operate. The operation of relays CO at its armature 32 connects battery by way of conductor 18 to the wiper 5 of the switch TF—00 and the terminal upon which the wiper is resting and thence to the same numbered terminal of all the other transmitter finder switches TF over a multiple connection between the banks 5 thereof, thereby making this set of terminals busy to other transmitter finder switches TF. This busy battery is subsequently replaced by battery from the transmitter, and the circuits therefor, will be described in connection with the description of the transmitter operation.

When armature 4 of relay CO—00 moved away from its break contact, the circuit to line relay LR—00 was opened and the line relay released. When the armature 4 of relay CO—00 engaged its make contact, the dial line was extended to wiper 4 of the rotary switch TF—00, conductor 4 of cable 33, armature 34 and break contact of relay ST, conductor 7 of cable 35, break contact and armature 36 of relay TO and break contact and armature 37 of relay TO1 in parallel, to the winding of relay A and thence to battery. Relay A operates over the circuit just described and applies battery at its armature 38 and make contact thereof to the winding of relay B causing relay B to operate. When the armature 39 of relay A engaged its make contact, battery was applied to conductor 5 of cable 35, conductor 5 of cable 33 and thence to terminal 1 of bank 5 of all the transmitter finder switches TF as a busy condition to other hunting TF switches. When relay B operated, it applied battery by way of its armature 41 to the circuit just traced and, since relay B is a slow releasing relay, it maintains battery on this circuit during the time the relay A is pulsing under control of the pulse contacts P of the subscriber's dial. When relay LR released, following the operation of relay CO, battery at armature 5 of relay LO was removed from the winding of relay TO causing relay TO to release and release relay GTO. The release of the guard relays TO and GTO leaves them free to be operated by another LR relay for the seizing of another transmitter.

The operation of relay A at its armature 42 and make contact thereof applied battery to the winding of relay SNR, causing relay SNR to operate and the "in-service" lamp IS to be lighted as an indication that the transmitter is in use. The operation of relay SNR at its armature 43 removes battery from conductor 4 of cable 44 extending to the strapped contacts of bank 5 of the rotary switch HSN. Similarly the operation of the armatures 45 and 46 of relay SNR removes battery from the conductors 5 and 6 of cable 44 extending to the strapped terminals of bank 5 of the TSN and USN switches respectively.

When armature 47 of relay B engages its make contacts battery is applied to conductor 48 and maintains relay SNR operated during the period when relay A released during pulses. When the dial line was transferred by the operation of relay CO—OO from the winding of relay LR—OO to the winding of relay A, the line current was increased due to the lower resistance of the winding of relay A. This increased current causes the ready lamp R in the dial-ticker to light as an indication to the subscriber that a transmitter has been seized and that dialing may be started. It will be recalled, in the example assumed, that the subscriber will dial a stock whose code number is 123 and as the finger plate of the dial is moved from its normal position, the contact ON of the dial is closed thereby shunting the filament of the lamp R. As the dial returns to normal the pulse contact P will operate once, thereby sending one dialing impulse over the subscriber's line to the relay A, to cause the relay A to release and then reoperate. When armature 39 of relay A engages its break contact, battery is applied to armature 49 of relay B and the make contact thereof to cause the relay C to operate, relay B being slow to release remains operated during the momentary release of the relay A. When armature 51 of relay C engages its make contact, battery is applied to the winding of the stepping magnet DS of the dial sequence switch causing this magnet to attract its armature. As relay A released the battery at armature 42 of relay A was connected to the armature 52 of relay B and make contact thereof and thence to the wiper 1 of switch DS and terminal 1 of the switch bank, conductor 8 of cable 44 and thence to the winding of the stepping magnet of the switch HSN to ground, thereby causing the stepping magnet HSN to operate.

Since a single impulse is dialed for the first digit of the stock number in the assumed example, relay A reoperates and remains reoperated for an appreciable length of time. The reoperation of the relay A at its armature 42 removes battery from the winding from the stepping magnet of the switch HSN causing the switch HSN to step to terminal 1 and to store the digit 1 dialed by the subscriber as the hundreds stock number digit. The reoperation of relay A at its armature 39 also removes battery from the winding of relay C, causing the relay C to release and at its armature 51 remove battery from the winding of the stepping magnet DS, thus advancing the wipers of the dial switch to their terminals 2.

As the subscriber dials the digit 2 corresponding to the tens digit of the stock number the relay A is released twice and the cycle of operations just described is repeated, the C relay operating on the first release of the relay A and remaining operated until the relay A has twice released at which time the switch DS is advanced to terminal 3. With the wipers of the switch DS resting on their terminals 2, each release of relay A caused a battery impulse to be transmitted from its armature 42 to the operated armature 52 of relay B, the wiper 1 and terminal 2 of the switch DS, conductor 9 of cable 44 to the winding of the stepper magnet of the switch TSN which operates to advance the wipers thereof to terminal 2 and thus store the tens digit 2 of the stock number. The units digit 3 of the stock number is dialed and the A relay is caused to release and reoperate three times, with the switch DS resting on terminal 3 and thus establishing a connection from the stepping magnet of the switch USN by way of conductor 10 of cable 44 and terminal 3 of the switch DS and wiper 1 thereof through the operated armature 52 of relay B and the break contact and armature 42 of relay A to battery. The switch USN is thus advanced to terminal 3 over the circuit just described thereby storing the units digit 3 of the stock number. When the relay A reoperates after the third digit has been stored, the relay C is released thereby advancing the switch DS to terminal 4.

With the wipers of the switch DS resting on terminal 4 a circuit is closed from battery at the operated armature 54 of relay B, conductor 55, terminal 4 of bank 2 of the switch DS, wiper 2, conductor 1 of cable 35, winding of relay ST, Fig. 3, and thence to ground causing the relay ST to operate and lock by way of its armature 56 to battery at the break contact and armature 57 of relay S4. The operation of relay ST at its armature 34 opens the line circuit thus causing the release of relay A which causes the relay C to reoperate. The release of the relay A at its armature 38 causes relay B to release and at armature 49 of relay B opens the circuit to the winding of relay C, thereby releasing relay C and advancing the wipers of the switch DS to terminal 5. The relays A, B and C are now in their original unoperated condition awaiting reoperation by a succeeding subscriber's dial call. The DS switch has been advanced to the next succeeding home position and rests there awaiting another call. It will be noted that the wiring of the banks of the switch DS is arranged to provide six home positions for the switch.

When armature 58 of the relay ST engages its make contact, battery is applied to conductor 2 of cable 35 and thence to the winding of relay SNR, thereby holding relay SNR operated after relays A and B have released. The operation of relay ST at its armature 59 applied battery to conductor 5 of cable 33 extending to the switch banks 5 of switches TF as a busy condition to other hunting transmitter finding switches. Battery is also supplied from the switches HSN, TSN and USN by way of their wipers 4 and the off-normal bank contacts to conductor 7 of cable 44, conductor 5 of cable 35 and thence to the terminals of the bank 5 of the switches TF. The operation of relay ST started the transmitting distributor in operation to transmit the stock number to the subscriber's ticker, and also operated the transmitter guard relay TG, Fig. 4, as an indication that a price is required of the stock.

While these two functions are started simultaneously for the sake of clearness they will be described separately, the operation of the transmitter for transmitting a stock number being described first. The brushes of the transmitting distributor are normally held at rest on their segments 1 of the distributor by a circuit which extends from battery on the solid ring R2, brush B1, segment 1 of ring R1, conductor 18 of cable 61, break contact and armature 62 of relay C4, break contact and armature 63 of relay C3, break contact and armature 64 of relay C2, break contact and armature 65 of relay C1, conductor 66, terminal 1 of bank 5 of the switch TS and the wiper thereof, conductor 67, wiper 6 of switch TS and contact 1 thereof, conductor 68, the lamp SML, the start magnet SM and thence to ground thereby holding the start magnet SM energized and attracting the latch thereof whereby it engages the appropriate one of the projections 62 of the brush arm 63. The lamp SML is included in the circuit of the start magnet to limit the current flowing through the winding of the start magnet when the lamp heats up. When the circuit to the start magnet is opened the lamp SML is extinguished and the resistance of the lamp increases whereby, when the circuit to the magnet SM is again closed, the initial current flowing through the circuit is relatively high and of sufficient strength to cause the start magnet SM to operate, but after the magnet SM has been operated for a short period of time the lamp SML heats up and increases its resistance thereby reducing the current flowing through the magnet SM thus protecting the magnet coil against overheating.

The distributor shown on Fig. 3 of the drawings comprises two feeder rings and two segmented rings, each of the segmented rings having 28 segments. The brush arm 63 carries the brushes B1 and B2 and is provided with 28 detents 62 each adapted to be engaged by the latch of the start magnet SM whereby the brush arm 63 may stop in any one of 28 different positions under control of the magnet SM. The brushes B1 and B2 are normally in engagement with their segments 1, in which position the transmitting distributor is invariably found at the beginning of a transmission of ticker signals to a calling subscriber.

When relay ST operated it connected battery from the armature 63 and break contact of relay S1, conductor 64 and thence to the make contact and armature 65 of relay ST, conductor 3 of cable 33, terminal 1 of switch 3 and wiper of switch TF—00, conductor 66, make contact and armature 67 of relay CO—00 to the winding of relay TR—00, thereby operating relay TR—00. The operated relay TR locks by way of its armature 68 and make contact, conductor 69, wiper 1 and contact 1 of switch TF—00, conductor 1 of cable 33 to the break contact and battery at the armature 71 of relay RL2, Fig. 3.

The operation of relay TR connected the subscriber's ticker to the transmitting distributor TD over the following circuit: Ground, print magnet winding PW and escapement winding EM of the ticker, the ticker line 1 of cable 1, ticker line jacks C and D, armature 72 and make contact of relay TR—00, wiper 2 of the switch TF—00 and contact 1 thereof, conductor 2 of cable 33, armature 60 and break contact of relay PC, conductor 1 of cable 73, ring R4, brush B2, segment 1 of ring R3, conductor 2 of cable 73, resistance 74 and lamp 75 to positive battery. Segment 1 of the distributor ring R3 is connected to all of the other odd numbered segments of this ring whereby positive battery is supplied to the ticker line over the circuit just traced whenever the brush B2 engages any of the odd numbered segments. When the brush engages any of the even numbered segments of the ring R3, the ticker line is connected through conductor 3 of cable 73, resistance 77 and lamp 78 to negative battery. Whenever the relay PT operates, the resistances 74 and 77 are shorted out by armatures 76 and 79 respectively of the relay PT and the resultant increase in the ticker line current causes the print magnet PW to operate and the ticker to print the selected characters, step the tape ahead and impart energy to the ticker spring which causes the escapement mechanism of the ticker to function when subsequent escapement impulses are received. The operation of relay ST also completed a circuit from battery on the ring R2 of the distributor TD, brush B1, segment 1 of ring R1, conductor 18 of cable 61, break contact and armature 62 of relay C4, break contact and armature 63 of relay C3, break contact and armature 64 of relay C2, break contact and armature 65 of relay C1, conductor 66, terminal 1 of the switch TS and wiper 5, conductor 67, wiper 6 of the switch TS and terminal 1 thereof, armature 81 and break contact of relay RL1, armature 82 and break contact of relay PC, conductor 83, armature 84 and make contact of relay ST, break contact and armature 85 of relay S2 and thence to the winding of relay PT and ground, thereby causing relay PT to operate and at its armature 76 short circuit the resistance 74 and cause the ticker to print a dot upon the ticker tape due to the increase in the line current resulting from shorting the resistance 74.

When armature 86 of relay PT engages its make contact, battery is applied to conductor 87 and thence to the winding of the stepping magnet of the switch TS, thereby energizing the stepping magnet. When armature 88 of relay PT engaged its make contact, ground was connected to the winding of relay PC whereby it causes relay PC to operate and at its armature 82 interrupt the circuit to the winding of relay PT, thereby causing relay PT to release. The release of relay PT at its armature 88 caused relay PC to release and the TF switch to step to the second set of terminals.

In order that no appreciable residual magnetism may result in the print magnet core of the ticker and thereby prevent proper operation of the printing and winding mechanism, a circuit including combination of contacts of the PT and PC relays is provided which causes the line circuit to be opened for a predetermined time during the operation of these relays. The ticker line normally is connected in series with the armature 60 and break contact of relay PC.

However, the operation of relay PT at its armature 89 closes a circuit in parallel with the armature 60 and break contact of relay PC to prevent opening of the line circuit until such time as the PT relay has released upon the operation of relay PC. With relay PT released and relay PC still operated, the line is open. Relay PC in releasing after the release of relay PT reestablishes the line circuit to the ticker in preparation for the next signal.

With the wipers of the switch TS resting on their terminals 2 the ticker line circuit is again closed when relay PC releases, and the relay PT again operates to increase the ticker line current and thereby cause the ticker to print a dot, wind the ticker spring and step the tape. The stepping magnet of the switch TS is also energized thereby to step the switch TS ahead when relay PT releases. The operation of relay PC by relay PT in the manner described causes the release of relay PT which in turn releases relay PC. With the wipers of the switch TS resting on their third set of terminals, when the relay PC is released an operate circuit to the relay PT is established and the relays PT and PC function as before to print another dot on the ticker tape, wind the ticker and advance the tape, the ticker sequence switch TS now stepping to position 4.

With the wipers of the TS switch resting on their terminals 4, the circuit from segment 1 of the distributor through the break contacts and armatures 62, 63, 64 and 65 of relays C4 to C1 to the stop magnet of the distributor is opened at the wipers 5 and 6 of the switch TS. The stop magnet is, however, held operated by a circuit from battery at the operated armature 91 and make contact of relay PT, break contact and armature 81 of relay RL1, the lamp SML and the winding of the stop magnet SM to ground. The release of relays PC and PT now causes battery to be removed from this circuit and the stop magnet is thus deenergized thereby withdrawing its pawl from engagement with the detents 62 of the brush arm 63 whereupon the brushes of the distributor are set into rotation. In order that the typewheel of the ticker may be in synchronism with the distributor brush R, means are included in each ticker which causes the ticker typewheel to stop at a particular point during the reception of a certain number of escapement signals. The brush arm is then stopped at an equivalent position and a print impulse is transmitted to the ticker which causes the unison mechanism to release the typewheel for rotation with the brush arm. The signal for releasing the unison mechanism also causes the ticker to print a dot on the tape and the tape to be stepped.

In the present embodiment of the invention the brush R of the distributor is caused to rotate for three revolutions thus sending sufficient signals to insure that the typewheel has been stopped by the ticker unison mechanism. The three print impulses just sent to the ticker therefore were primarily for the purpose of storing sufficient energy in the escapement spring of the ticker to rotate the typewheel in response to the unison signals which are about to follow.

When the brush B1 engages segment 22 of ring R1 during the first revolution of the distributor TD, battery is connected from ring R2 by way of brush B1 to terminal 22 of ring R1, conductor 1 of cable 90, armature 92 and make contact of relay ST, conductor 1 of cable 93, armature 94 and break contact of relay S1 and thence to the winding of the relay STP and thence to ground causing relay STP to operate. When armature 94 of relay STP engages its make contact, battery is applied to the winding of the stepping magnet of the switch TS causing the stepping magnet to be energized. As the brush B1 engages terminal 23 of the ring R1, battery is applied to conductor 2 of cable 90, armature 95 and make contact of relay ST, conductor 2 of cable 93, armature 96 and break contact of relay S1 to the winding of the relay STP thereby holding it operated. When the brush B1 engages segment 24 of ring R1, battery is connected to conductor 3 of cable 90, armature 97 and make contact of relay STP thereby holding the operated STP relay locked. When the brush B1 engages contact 25 of ring R1, battery from ring R2 is connected to conductor 4 of cable 90 and thence by way of armature 98 and make contact of relay STP to the winding of relay STP to insure that it will remain locked until after the brush B2 has passed off from segment 25 of the ring R1. The relay STP is thus held operated during the time of passage of the brush B1 over 4 consecutive segments of the ring R1 to insure that battery will be applied to the winding of the stepping magnet of the switch TS for a sufficient length of time to insure reliable operation of the switch. When the brush B1 leaves segment 25 of ring R1, relay STP releases and at its armature 94 removes battery from the stepping magnet TS causing the wipers of the switch TS to be advanced to the fifth set of contacts.

During the second and third revolutions of the distributor TD the relay STP is operated as the brush B1 passes over segments 22 to 25 of the ring R1 thereby operating the stepping magnet TS twice to step the wipers of the switch TS to terminal 7. The TS switch has now been employed to count three revolutions of the distributor for synchronism of the typewheel of the ticker with the brush arm of the distributor, and the brush arm will presently be stopped as the blank segment 1 of the distributor is engaged by the brushes at the beginning of the fourth revolution thereof.

With the wipers of the switch TS resting on terminal 7, battery from terminal 7 of bank 5 of the switch is connected to wiper 5 and thence by conductor 67 to wiper 6 and terminal 7 of bank 6, conductor 99 and thence to the winding of relay S1 causing relay S1 to operate and lock by way of its armature 101 and make contact to the break contact and battery on armature 71 of relay RL2. Relay S1 at its armature 102 short circuited the lamp SML and at its armatures 102 and 103 it caused the stop magnet SM to be energized as the brush B1 engaged terminal 1 of ring R1 over the following circuit: Ground, winding of stop magnet SM, contact and armature 102 of relay S1, armature 103 and make contact of relay S1, armature 65 and break contacts of relay C1, armature 64, break contact of relay C2, armature 63 and break contact of relay C3, armature 62 and break contact of relay C4, conductor 18 of cable 61, segment 1 of ring R1, brush B1, ring R2 to battery.

When relay PT released ground is applied at contact 118 of relay PT to conductor 119 and then removed from armature 107 of relay PT connected to conductor 1 of cable 108 to insure that the locking circuit for the coding relays C1 to C5 is established before the operating circuits of these relays is interrupted. The coding relays C1 to C4 are operated in combinations in accordance with the digit to be transmitted. For each of the digits 1 to 9 and 0 the relay C5 is unoperated but whenever a fraction is to be transmitted the relay C5 is operated in addition to the combination of relays C1 to C4 which determines the value of the fraction digit. The combination of the relays C1 to C5 will be in accordance with the price code shown on Fig. 11 of the drawings. The operation of relay C5 transfers the connection from the coding relays to segments 2 to 8 of the distributor, which are employed for transmitting the digits 1 to 7, to segments 22 to 28 which are employed for transmitting the fractions ⅛ to ⅞ respectively. With all of the coding relays unoperated or with any code combination set up therein which is not used for the characters shown on Fig. 11, the dot on the typewheel is selected by the transmitting distributor coming to rest on segment 1.

The seventh terminal of banks 1, 2, 3 and 4 of the switch TS are connected by way of conductors 1, 4, 7 and 10 of cable 118 to the contacts of banks 2 and 3 of switch HSN in such a manner that for each of the positions in which the switch HSN may be set to store any of ten digits, a different combination is set up on these conductors. For example, with the wipers of the switch HSN resting on terminal 1 to store the digit 1, battery would be connected to the conductors 1 and 4 of cable 118 by the wipers 3 and 2 respectively of the switch HSN thereby operating code relays C1 and C2 corresponding to the digit 1. Whereas, if the switch HSN were set to the second position to store the digit 2 with the wipers 2 and 3 contacting their terminals 2, battery would be applied to conductors 1 and 7 of the cable 118, thereby operating code relays C1 and C3 corresponding to the digit 2, the code relay operating for each digit of the stock number, in each case, being in accordance with the arrangement of Fig. 11.

Since in the assumed example, the subscriber dialed a stock whose number was 123, the wipers of the switch HSN are now resting on their terminals 1 and thus supply battery from wipers 2 and 3 of the switch HSN to terminal 7 of the wiper of banks 1 and 2 of the switch TS and thence to one side of the one winding of the relay C1 and C2.

When the relay PT operates to print the dot and release the unison mechanism after the synchronism impulses have been transmitted to the ticker, the coding relays C1 and C2 will be operated from ground at armatures 107 and 109 of relay PT and lock by way of their armatures 117 to battery when the locking circuit is completed to ground at contact 118 of relay PT as the relay releases. The release of relay PT at its armature 88 caused relay PC to release and at its armature 82 interrupt the circuit from battery through the resistance 259 to the stop magnet SM releasing the stop magnet, thereby releasing the brushes B1 and B2 for rotation. As brush B1 engages segment 2 of ring R1, battery is applied to segment 2 thereof from ring R2 through brush B1 and thence through conductor 1 of cable 61, break contact and armature 119 of relay C5, break contact and armature 121 of relay C4, break contact and armature 122 of relay C3, make contact and armature 123 of relay C2, make contact and armature 65 of relay C1, contact and armature 103 of relay S1, armature 102 and contact of relay S1 to the stop magnet SM operating the stop magnet.

The operation of the stop magnet SM causes the distributor brushes 1 to come to rest on their terminals 2. As brush B2 moved off from segment 1 of ring R3 positive battery on conductor 2 of cable 73 was removed from the ticker line and as the brush B2 engaged segment 2 of the ring R3 the ticker line was connected to conductor 3 of cable 73 and thence to positive battery. The reversal of the line battery from positive to negative actuated the ticker escapement to cause the typewheel to move from the unison stop position to character 1 position. As the brushes come to rest on their segments 2, battery at ring R2 is applied to segment 2 of ring R1 by the brush B1 and thence to the winding of relay PT causing relay PT to operate and transmit the print current to the ticker, thereby causing the ticker to print the digit 2 upon the tape and also step the tape ahead one position. The operation of relay PT at its armature 86 applies battery to conductor 87 and thence to the stepping magnet of the switch TS causing the stepping magnet to be energized and remain energized over a circuit including resistance 106, armature 105 and make contact of relay PC, make contact and armature 63 of relay S1 to battery. When relay PC releases the circuit is interrupted at its armature 105 and the switch TS steps to terminal 8.

With the wipers of the switch TS resting on their terminals 8 the circuit for operating the coding relays C1 to C4 is completed over conductors 2, 5, 8 and 11 of cable 118 to battery at the wipers 2 and 3 of the switch TSN in accordance with the setting of the switch TSN. When relay PT operated and opened its contacts 118 the operated coding relays C1 and C2 release. With the relay PT now released and the wipers of the switch TS resting on their terminals 8 a circuit is completed from battery and wipers 2 and 3 of the switch TSN, contacts 2 thereof by way of conductors 2 and 8 of cable 118 through wipers 1 and 3 of the switch TS to the windings of the coding relays C1 and C3 causing these relays to operate when armatures 107 and 110 of relay PT engage their make contacts. When relay PC releases the wipers of switch TS are stepped to their ninth terminals preparatory to picking up the code from the USN switch from the succeeding operation of relay PT and the distributor brush arm is freed for further rotation. The distributor brushes moved to their segments 2 and again a circuit is completed through the contact of the coding relays to the stop magnet of the distributor and to the relay PT. When brush B2 engaged segment 3 of the ring R1, battery was applied to conductor 2 of cable 61, break contact and armature 124 of relay C5, break contact and armature 125 of relay C4, make contact and armature 126 of relay C3, break contact and armature 123 of relay C2, make contact and armature 65 of relay C1, make contact and armature 103 of relay S1, armature 102 and make contact of relay S1 and thence to the winding of stop magnet SM, thereby causing the stop magnet to attract its latch and stop the brushes on segments 3, the battery at segment 3 of the ring R1 also operating the relay PT. As brush B2 passed from segment 2 to segment 3 of the ring R3 the ticker line circuit was transferred from conductor 3 to conductor 2 of cable 73 and the line polarity to the ticker was reversed from negative to positive thereby stepping the ticker typewheel to the character 2 which will be printed upon the tape when the relay PT operates.

When relay PT is operating to print the digit 2 again, it causes the coding relays to take a setting, this time in accordance with the code stored on the USN rotary switch by way of conductors 3, 6, 9 and 12 of cable 118 connected to terminal 10 of the switch banks 1, 2, 3 and 4 of the switch TS.

As the distributor brushes moved to their segments 3 a circuit to the stop magnet SM is again completed stopping the brushes on segment 3 and the typewheel of the ticker on the character 3. When brush B1 engaged segment 4 of ring R1, battery was connected to conductor 3 of cable 61, break contact and armature 127 of relay C5, make contact and armature 128 of relay C4, break contact and armature 126 of relay C3, break contact and armature 123 of relay C2, make contact and armature 65 of relay C1, make contact and armature 103 of relay S1, armature 102 and make contact of relay S1 to the winding of the stop magnet, thereby stopping the distributor with the brushes thereof in engagement with their segments 4. As the brush B1 moved from segment 3 to segment 4 of the ring R3, the polarity of the ticker line was changed from positive to negative thereby operating the escapement mechanism of the ticker and causing the ticker typewheel to be advanced one step in a position to print the digit 4. The wipers of the switch TS were advanced to terminal 10 by the previous operation of the relays PT and PC. When relay PT operates to print the digit 3 the coding relays C1 and C4 release since each of the wipers of the banks 1, 2, 3 and 4 of the switch TS are in contact with terminal 10 which is an unconnected terminal. With all of the coding relays in their unoperated positions a dot is to be printed next on the tape, the purpose of this dot being to separate the stock number from the succeeding digit which will be the first digit of the bid price.

At the time of the release of the relay PC during this cycle of operation the switch TS is stepped to terminal 11, thereby causing relay S2 to operate over the following circuit: Battery at armature 104 and make contact of relay S1, conductor 67, wiper 6 and terminal 11 of the switch TS, conductor 129, winding of relay S2 to ground. The release of relay PC causes the distributor brushes to rotate to their segments 1 and during this rotation to transmit positive and negative signals alternately to the escapement mechanism of the ticker thereby causing the ticker typewheel to rotate in synchronism with the distributor and come to rest in the blank position.

When brush B1 engages segment 1 of ring R1 battery is applied to conductor 18 of cable 61 and thence to armatures 62, 63, 64 and 65 at the break contact thereof of relays C4, C3, C2 and C1 respectively, make contact and armature 103 of relay S1, armature 102 and make contact of relay S1 and thence to the winding of the stop magnet causing the distributor to come to rest on segment 1. The operation of relay S2 at its armature 85 interrupted the circuit to the relay PT, thereby preventing the relay PT from operating in parallel with the stop magnet as heretofore.

During the time that the distributor TD was undergoing the foregoing cycles of operation the equipment and circuits required for taking a price from the indicators of the check board have been functioning. This equipment comprises the sequence, counting and AG relay group and the selector. When the relay ST first operated, battery at its armature 131 and make contact thereof was connected to armature 132 and break contact of relay S4, armature 133 and break contact of relay S3, conductor 2 of cable 134, break contact and armature 135 of relay SS to the winding of relay TG and thence to ground, thereby causing the relay TG to operate.

There is one TG relay provided for each transmitter, and one end of the windings of the TG relays of all transmitters, with the exception of the first transmitter which is connected directly to ground, are connected to ground through a series circuit extending through break contacts of TG relays of a lower order. For example, the winding of relay TG of transmitter TR2 extends to ground through the unoperated armature 135 of relay TG of transmitter TR1. Similarly the winding of the TG relay of transmitter 25 is extended in series with the contact 136 of unoperated relays TG of all transmitters of a lower denomination to the grounded armature 135 of relay TG of transmitter TR1. By means of this arrangement any TG relay of a higher number cannot be operated when one or more TG relays of a lower number is operated. The operation of the TG relay also caused relay SS to operate over the following circuit:

Battery and armature 137 and break contact of relay SQ6, Fig. 6, conductor 138, operated contact 139 of key SQC, conductor 7 of cable 141, armature 142 and break contact of relay SS of transmitter TR1 from whence the circuit is continued through break contacts and armatures of the SS relays of each of the other transmitters TR2 to TR25 in series and thence to armature 143 and break contact of relay TG of transmitter TR25 in series with armatures and break contacts of other TG relays of transmitters TR24 to TR2, armature 144 and make contact of relay TG of transmitter TR1 and thence to the winding of relay SS and to ground. Relay SS locks by way of its armature 145 and make contact to conductor 1 of cable 141, conductor 138 and thence to battery on the break contact and armature 137 of relay SQ6. The operation of relay SS at its armature 142 interrupted the circuit to other SS relays so these other SS relays may not be operated in response to the operation of other TG relays until the operated SS relay of transmitter TR1 has released. The operation of relay SS at its armature 135 caused relay TG to release and at its armature 135 connect ground to the circuit extending to the windings of TG relays of a higher order so that any of these other TG relays, which at this time may have battery applied to the opposite ends of their windings, will operate and lock. The highest numbered TG relay which operates at this time will interrupt the ground circuit from the windings of TG relays of higher denominational value, thus preventing their operation until such time as the operated TG relays are released. The operation of relay SS at its armature 146 applies battery to conductor 1 of cable 44 extending to wiper 1 of the switch HSN which, it will be recalled, is now resting upon contact 1 of the switch bank and thence by conductor 1 of cable 147 to the winding of the hundreds stock number relay, H1 which operates. The operation of the relay SS at its armature 148 connected battery to conductor 2 of cable 44, wiper 1 and terminal 2 of switch TSN, conductor 2 of cable 149, contact 150 of the relay H1, conductor 2 of cable 151, winding of the tens stock number relay 12 to ground causing the relay 12 to operate.

Figure 7:
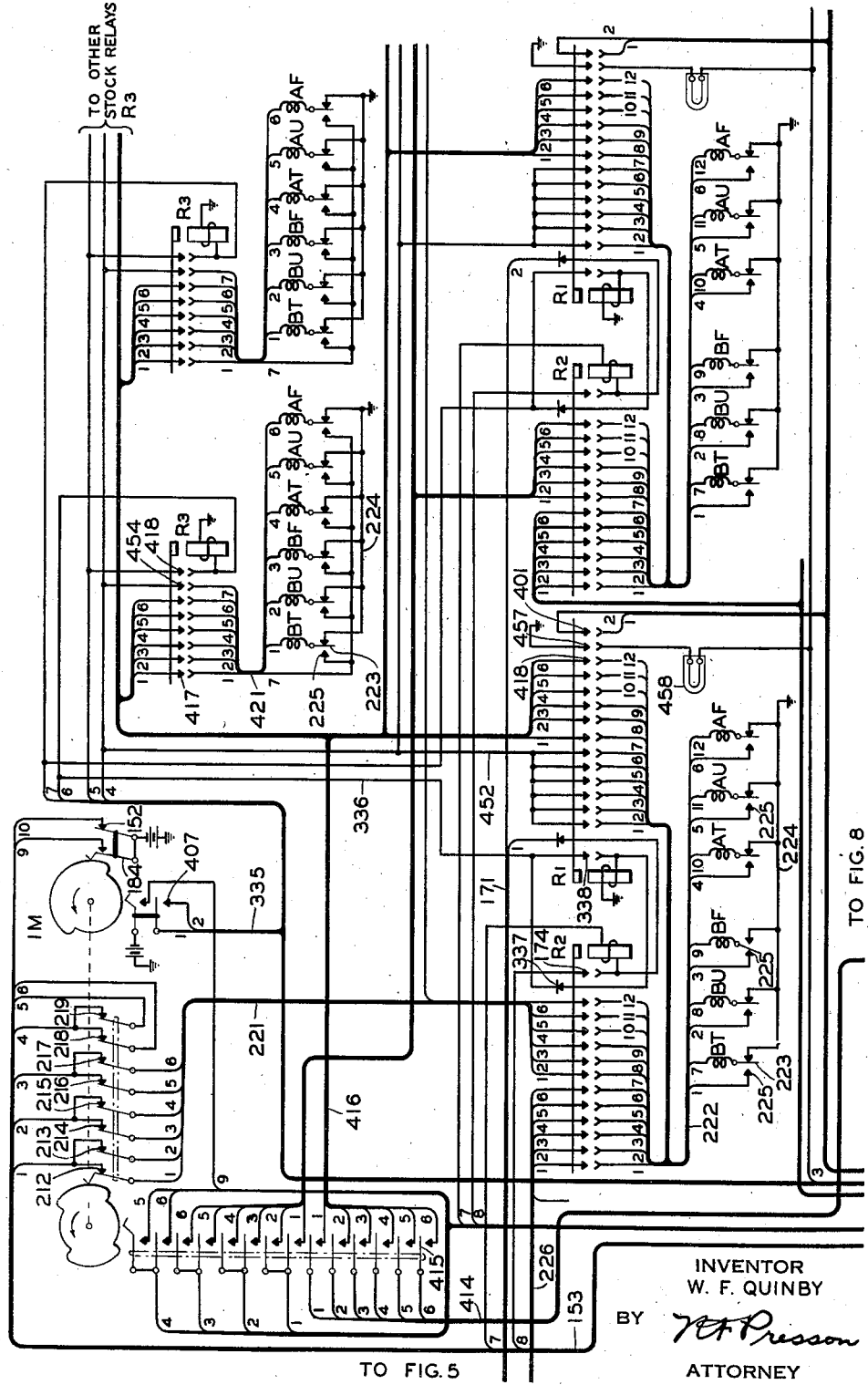

The operation of relay SN also closed the circuit from battery at contact 152 of the impulse machine IM, Fig. 7, conductor 10 of cable 153, contact 154 of relay SQR, conductor 155, armature 156 and break contact of relay SQ2, conductor 2 of cable 141, make contact at armature 157 of relay SS, conductor 3 of cable 141 to the winding of relay SQ1, and thence to ground thereby causing relay SQ1 to operate when the interrupter contacts 152 engage one another. The operation of relay SQ1 at its armature 158 connects battery to the lamp SQ and to the sequence meter SQM, thereby lighting the lamp and operating the meter, the operation of the lamp serving to indicate that the sequence relays are in operation. Relay SQ1 at its armature 159 completes a locking circuit in series with the winding of relay SQ2 by way of conductor 161 to battery on the break contact and armature 162 of relay SQR. As long as the contacts 152 of the impulse machine IM are closed battery is connected to both sides of the winding of relay SQ2 preventing its operation, but when the contacts 152 are opened the relay SQ2 operates in series with the winding of relay SQ1. When the impulse machine again closed its contacts 152 battery is applied to conductor 10 of cable 153 to the contacts 154 of relay SQR, conductor 155, armature 156 and make contact of relay SQ2, armature 163 and break contact of relay SQ4 to the winding of relay SQ3 causing the relay SQ3 to operate. The operation of relay SQ3 at its armature 164 connected battery to conductor 4 of cable 141, armature 165, and make contact of relay SS, conductor 1 of cable 134, one winding of relay FC, conductor 3 of cable 44, wiper 1 and contact 3 of switch USN, conductor 3 of cable 166, contact 167 of relay 12, conductor 3 of cable 168 to jack 169.

Assuming that the plug 170 is inserted into the jack 169, circuit is continued by way of plug 170, conductor 1 of cable 171, break contact 172 of relay R1, winding of stock relay R2, conductor 7 of cable 153, armature 173 and break contact of relay ST1, Fig. 6, to ground thereby causing relay R2 to operate and select the indicators for the stock 123. Each stock relay R2 is connected by means of a flexible conductor to a plug as 170 whereby the connection to the different stock relays R2 may be interchanged by merely inserting the plugs 170 into the proper jacks 169. It will be noted that in the circuit just described the operation of relay R2 is controlled by a break contact on relay R1 in such a manner that, if the associated relay R1 is operated to cause the change of a price setting of the indicators by the operator, the relay R2 cannot operate until after relay R1 has released. It will further be noted that the opposite end of the winding of the gang relay R2 is connected to ground through armature 173 and the break contact of relay ST1, it being assumed that stock Dome Mine selected by dialing the digits 1, 2 and 3 in succession is located on the first, or channel 1.

When relay R2 operated and closed its contacts 174 the operate battery was extended by conductor 8 of cable 153 to contacts 175 of relay ST1 and thence to armature 176 of relay SQ4 and to the make contact of armature 283 of relay WS1. This source of battery is used for performing various functions as the operation of the sequence relays continues and these functions will be described in their normal sequence.

When relay SQ3 operated its armature 177 connected battery through the make contact thereof to the winding of relay SQ4, the other end of which is connected to battery at armature 162 of relay SQR by the conductor 161. When the pulsing contacts 152 are opened, relay SQ4 operates in series with relay SQ3 over the circuit just described and at its armature 176 connects battery to conductor 6 of cable 141, armature 178 and make contact of relay SS to the winding of the channel 1 multiple relay M1 of the transmitter causing this relay to operate.

The operation of relay SQ4 at its armature 163 transferred the pulsing circuit from the winding of relay SQ3 to the armature 179 and break contact of relay SQ6 and thence to the winding of relay SQ5, causing relay SQ5 to operate when the impulse contacts 152 are again closed. When relay SQ5 operates a circuit is closed from battery at the winding of the relay R2 through contacts 174, conductor 8 of cable 153, make contact and armature 181 of relay SQ5, armature 182 and break contact of relay WS1 to the winding of relay ST1 causing relay ST1 to operate. The operation of relay SQ5 at its armature 183 closed a circuit through the winding of relay SQ6 to the armature 162 and break contact of relay SQR to battery. With relay ST1 operated, the closure of contacts 184 of the impulse machine IM connected battery to conductor 9 of cable 153, contact 185 of relay CR, conductor 186, armature 187 and break contact of relay CT2, make contact and armature 188 of relay ST1, contacts 189 of the relay CIC, winding of relay CT1 and thence to ground, thereby causing relay CT1 to operate.

When armature 191 of relay CT1 engaged its make contact, battery is applied to conductor 192 and armature 193 and make contact of relay ST1, thereby locking relay ST1 under control of relay CT1. Battery at the operated armature 191 of relay CT1 also is connected by way of conductor 192 to armature 194 and make contact of relay ST1 and thence to conductor 8 of cable 153 extending to contacts 174 of relay R2, thereby locking relay R2 under control of relay CT1. Battery at armature 191 of relay CT1 is connected by way of armature 194 and make contact of relay ST1 to conductor 3 of cable 195, the closed contacts 196 of relay M1 and thence to the winding of relay M1, causing the relay M1 to be locked under control of relay C1.

At this point in the operation of the transmitter relay ST1 has set the counting relays in operation which operation is concurrent with the operation of the sequence relays. For the sake of clearness the complete operation of the sequence relays will be described first.

When the contacts 152 of the impulse machine IM opened at the termination of the third impulse, battery was removed from one end of the winding of relay SQ6, thereby causing relay SQ6 to operate in series with the winding of relay SQ5 to battery at armature 162 and break contact of relay SQR. The operation of relay SQ6 at its armature 137 removed battery from conductor 138 and caused the relay SS, Fig. 4, to release. The operation of relay SQ6 at its armature 179 also transferred the impulse circuit from the winding of relay SQ5 to the winding of relay SQR. The release of relay SS at its armatures 146 and 148 caused the release of the hundreds and tens stock number relays in the selector.

When relay M1 operated and closed its contacts 197 battery was applied to conductor 1 of cable 198, armature 199 and break contact of relay S4 to the winding of relay S3 causing relay S3 to operate. The operation of relay S3 at its armature 133 opened the operating circuit for the relay TG, thus preventing the reoperation of relay TG at the time relay SS releases and closes its contacts at armature 135. When the contacts 152 of the impulse machine IM are closed for the fourth time, relay SQR is operated over the following circuit: Battery, contacts 152 of the impulse machine, conductor 10 of cable 153, contacts 154 of relay SQR, armature 156 and make contacts of relay SQ2, armature 163 and make contact of relay SQ4, armature 179 and make contact of relay SQ6, winding of relay SQR to ground. As relay SQR operates and attracts its armature 199, the winding is connected by way of armature 199 to conductor 10 of the cable 153 before the contacts 154 of relay SQR have opened, thereby locking the relay SQR directly by way of its armature 199 to the operated contacts 152 of the impulse machine IM and battery. Thus, it will be seen that a circuit is prepared whereby the relay SQR is held operated for the duration of the impulse, while at the same time the operating circuit for the relay SQR has been opened. As armature 162 of relay SQR moved away from engagement with its break contact, battery is moved from conductor 161, thereby causing the sequence relays 1, 2, 3, 4, 5 and 6 to release.

Relay SQ6 upon releasing reestablishes the locking and operating circuits for the SS relays, thereby permitting another SS relay associated with the highest numbered operated transmitter guard relay to operate, providing another TG relay is operated as an indication that another transmitter is ready to obtain a price.

Relay SQR upon releasing at the termination of the fourth impulse from the impulse machine connects battery by way of its armature 162 to the sequence relays to permit their cycle of operation to be repeated in response to the operation of another relay SS if another transmitter is at the time, or subsequent thereto, ready to obtain a stock price from the stock indicators. At the time of the operation of relay ST1 its armature 173 opened the ground connected to the common side of all gang relays R2 associated with channel 2, thereby leaving the operated gang relay R2 in circuit with resistance 201 to ground. This resistance limits the current through the relay R2 to a value sufficient for maintaining the relay locked in the operated position, but does not allow sufficient current to flow to allow the operation of another gang relay in parallel with the operated gang relay R2. This lock-out feature is employed for the purpose of preventing the operation of a second gang relay R2 when a first gang relay R2 of the same channel is operated. The function of this circuit will be more fully described hereinafter.

The description will now revert to the counting relays whih operate in the following manner: It will be recalled that relay CT1 was operated by the closure of contacts 184 of the impulse machine IM after the relay ST1 had operated. The operation of armature 202 of relay CT1 connected battery to the counting lamp C1 and the meter CH1 thereby lighting the lamp and causing the meter to be operated. When armature 203 of relay CT1 engages its make contact, the battery impulse from contacts 184 of the impulse machine IM is connected to the winding of relay CT2, the other end of which winding is connected by conductor 204, armature 205 and break contact of relay CTR to battery. When the contacts 184 of the impulse machine IM are opened, battery is removed from one side of the relay CT2 causing it to operate in series with the winding of relay CT1, the other end of the winding of relay CT1 being connected to ground. The operation of relay CT2 at its armature 206 connects battery from armature 205 of relay CTR to the winding of relay TBF causing relay TBF to operate. The operation of relay TBF at its armatures 207, 208, 209 and 211 connect battery to conductors 1, 2, 3 and 4 of cable 153 extending to contacts 212 to 219 of the impulse machine IM, which close twice for every closure of the contacts 184 and 152 of the machine. The impulses generated by the contacts 184 and 152 each have a duration substantially equal to the intervals between impulses. The pulsing contacts 212 to 219 operate at twice the frequency of the contacts 184 and 152 and are adjusted so that their closure is slightly greater than half that of the contacts 184 and 152, and their open period at any time occurs at the time the contacts 184 and 152 open and the succeeding impulses which they generate are concluded as the half speed contacts close. For example, if we consider a series of four impulses of equal length and having substantially equal separation in time units therebetween generated by the contacts 212 to 219, the half speed contact would close at the termination of the first impulse and open at the termination of the second impulse, and half speed contact would close again at the termination of the third impulse and open at the termination of the fourth impulse. The closure of contacts 212 to 217 complete circuits over conductors 1 to 6 of cable 221 through operated contacts of the selected gang relay R2 hence by way of conductors 7, 8, 9, 10, 11 and 12 of cable 222 to the windings of the indicators BT, BU, BF and AT, AU and AF wherein is stored the bid and ask prices of the stock Dome Mine.

The stock indicators are operated by stepping impulses and are each provided with a switching mechanism 223 whereby the operating winding of each indicator is connected to contact 225 when the indicator is in the home or blank position and connected to the grounded conductor 224 when the indicator is in any of its moved positions. Since in the example assumed, the bid price is 40 and the ask price is 41½, the windings of the indicators BT, BU, AT, AU and AF are connected to the grounded conductor 224 and the winding of the indicator BF is connected by way of the switching mechanism to the contact 225. Each of the contacts 225 is connected by conductors 1 to 6 of cable 222 through operated contacts of the gang relay R2 to conductors 1 to 6 of cable 226 to the windings of relays BT, BU, BF, AT, AU and AF, Fig. 5, which relays are caused to operate in series with their respective indicators at the time the indicators are being stepped from their blank positions as will hereinafter appear.

When the indicator pulsing contacts 212 to 219 were first closed following the operation of relay TBF, each of the six indicators of the selected stock is energized and the opening of the pulsing contacts causes these indicators to be stepped to the succeeding digit or position. Since in the example assumed, there is no character displayed on the bid fraction indicator BF, this indicator is setting on its blank position with the switching mechanism 223 in engagement with its contact 225. The first battery impulse to indicator BF, therefore operates relay BF in series to ground. Whereas the other five indicators are at this time in their moved positions they are operated by the first impulse to ground through to the conductor 224.

The operation of relay BF in response to the first operating impulse to the bid fractions indicator at its armatures 227, 228, 229 and 230 connects the windings of storage relays Q3, Q9, Q15 and Q21, Fig. 4, by way of conductors 3, 9, 15 and 21 of cable 231, operated contacts of relay M1, conductors 3, 9, 15 and 21 of cable 232 to conductors 1, 2, 3 and 4 of cable 233 extending to the counting relays, Fig. 6. Since at this time none of the counting relays CT3 to CT12 are operated, the circuits including conductors 1, 2, 3 and 4 of cable 233 are opened at contacts of these relays and none of the relays Q3, Q9, Q15 and Q21 are operated. Therefore, when the wipers of switch TS are in contact with their terminals 13, none of the coding relays C1 to C4 of the transmitter will be operated and the transmitter TD will therefore transmit a blank signal to the ticker for the fraction denomination of the bid price of the stock.

The first impulse to the indicators caused them to be advanced one step. Therefore, at the time of the reception of the second impulse the bid indicators are setting on positions 5, blank 1, and the ask indicators on positions 5, 2 and 5, it being the usual practice to post the fractions part of the price as a digit representing the numerator of a fraction, the denominator of which is understood to be eight. As contacts 184 of the impulse machine are again closed, battery is connected to conductor 9 of cable 153, contacts 185 of relay CTR, conductor 186, armature 187 and make contact of relay CT2, armature 231 and break contact of relay CT4 to the grounded winding of relay CT3, causing relay CT3 to operate and at its armature 232 connect battery to one side of the winding of relay CT4, the other side of which winding is connected to battery at the break contact and armature 205 of relay CTR.

As the second impulse is received by the indicators for stepping them ahead to their succeeding positions, the BU relay is operated over a circuit including contact 225 of the switching mechanism of the indicator unit BU, the other five indicator units operating over a circuit including the grounded conductor 224. The operation of relay BU connects the windings of relays Q2, Q8, Q14 and Q20 to conductors 1, 2, 3 and 4 of cable 233, these conductors being opened at contacts of relay BU which released as the BU indicator unit stepped to position 1, in which position the switching mechanism 223 now switches the winding of the indicator from contact 225 to the grounded conductor 224.

Relay Q20 is operated over the following circuit: Ground at the winding of relay Q20, conductor 20 of cable 231, operated contacts of relay M1, conductor 20 of cable 232, contact and operated armature 233 of relay BU, conductor 4 of cable 233, make contact and armature 234 of relay CT3, break contact and armature 235 of relay CT4, break contact and armature 236 of relay CT5, break contact and armature 237 of relay CT6, break contact and armature 238 of relay CT7, break contact and armature 239 of relay CT8, break contact and armature 240 of relay CT9, break contact and armature 241 of relay CT10, break contact and armature 242 of relay CT11, break contact and armature 243 of relay CT12, conductor 5 of cable 153, contacts 219 of the impulse machine, conductor 4 of cable 153, make contact and armature 211 of relay TBF to battery. Relays Q2, Q8 and Q14 are unoperated as conductors 1, 2 and 3 of cable 233 are opened at contacts of the counting relays. Relay Q20 locks by way of its armature 244 and make contact, conductor 245 to battery at the break contact and armature 246 of relay RL1. It will be noted that the group of storage relays Q1 to Q24 is effective to store in permutation code the digits corresponding to the settings of the indicators of the selected stock. Since the setting of each indicator is represented in four unit permutation code, there are four relays Q associated with each indicator or 24 storage relays Q for six indicators. The operation of the relay Q20 in the manner just described has resulted in the storage of the digit 0, as the units digit of the bid price in the storage relays of the transmitter.

When contacts 184 of the impulse machine open at the termination of the second half speed impulse, battery is removed from one side of the winding of CT4, thereby causing relay CT4 to operate in series with the winding of relay CT3 to battery at armature 205 and break contact of relay CTR. With relays CT3 and CT4 operated a third impulse is sent to the selected indicators stepping them to their next positions. As none of the indicators are now resting on their blank positions, all of their switching mechanisms will be connected to grounded conductor 224 and none of the relays BT, BU, BF, At, AU and AF are operated at this time.

The operation of relay CT4 at its armature 231 transferred the pulsing circuit to the winding of relay CT5 which is the next relay of the group of counting relays to be operated when the contacts 184 of the impulse machine are again closed. The subsequent opening of the contacts 184 causes relay CT6 to operate and transfer the pulsing circuit to relay CT7.

The counting relays now continue to operate in response to the operation of contacts 184 of the impulse machine until 11 impulses have been transmitted to the indicators, the appropriate combination of storage relays Q being set up in code combination in accordance with the operated condition of the counting relays CT3 to CT12 at the time that the switching mechanisms 223 of the indicators engaged their contacts 225, as the indicators pass through their blank positions.

When the sixth half speed impulse is terminated, relays CT1 to CT12 are all operated. When the seventh half speed impulse occurred, battery is connected to conductor 9 of cable 153 by the contacts 184 of the impulse machine and thence through contacts 185 of relay CTR, conductor 186, armature 187 and make contact of relay CT2, armature 231 and make contact of relays CT4 to CT12 and thence to the winding of relay CTR, causing relay CTR to operate and at its armature 247 connect its winding to conductor 9 of cable 153, thereby locking relay CTR operated before the operating circuit has been opened at contacts 185 of relay CTR.

The operation of relay CTR interrupts the battery supply of the relays C1 to C12 and relay TBF, thereby causing them to release. As the interrupter contacts 184 open, relay CTR releases.

The release of relay TBS at its armatures 207, 208, 209 and 211 removes battery from contacts 212 to 219 of the impulse machine IM, thereby causing the indicators of the selected stock to come to rest on their original settings after having completed one complete revolution.

The windings of the storage relays Q in the transmitter are connected by way of cable 231 to contacts of relays M1 and M2 in parallel. With relay M1 operated, these circuits are extended to the windings of the relays BT, BU, BF, AT, AU and AF of channel 1 as shown on Fig. 5, whereas if relay M2 has been operated instead of relay M1, the windings of the storage relays Q would be connected by way of cable 248 to the group of AG relays BT to AF of channel 2. In the assumed example, the stock Dome Mine is posted in a channel 1 position, therefore, the storage relays Q are connected through the contacts of relay M1 to the channel 1 relays BT to AF.

When relay CT12 operated at the termination of the sixth half speed impulse, battery at armature 249 and make contact of relay CT12 was applied to conductor 251, conductor 1 of cable 195, contacts 252 of relay M1, conductor 2 of cable 198 and thence to the winding of relay S4, Fig. 3, thereby causing relay S4 to operate. Relay S4 locks by way of its armature 253 to the break contact and armature 71 of relay RL2 and thence to battery. The operation of relay CTR at its armature 254 applied battery to the circuit for the operation of the relay S4 after battery has been removed therefrom by armature 249 of relay CT12, as relay CT12 released.

As relay CT1 released battery was removed from its armature 191, thereby releasing the gang relay R2, multiple relay M1 and the start relay ST1 of the sequence relay group. The release of relay ST1 at its armature 173 short circuited the resistance 201 from the common circuit of the gang relays R2, thereby permitting another relay R2 in channel 1 to operate for obtaining the price from the selected indicators thereof.

The bid and ask prices have now been obtained from the indicators associated with the stock Dome Mine and this price has been stored in the storage relays Q of the transmitter and the relay S4 of the transmitter is operated to indicate that the price information has been stored and is now ready to be transmitted. The equipment for obtaining the price is therefore no longer required by the transmitter and is free to be used by other transmitters seeking price information.

The transmission of the stored price by the transmitter will now be described. When relay S4 operated several functions occur simultaneously in the transmitter. However, for the sake of clearness, these functions will be described separately.

The stock number dialed by the subscriber and stored in the switches HSN, TSN and USN has been transmitted to the ticker and the prices thereof have been obtained from the stock indicators, therefore the stock number switches HSN, TSN and USN may be released for operation by another dial ticker. The operation of relay S4 at its armature 57 removes locking battery from the start relay ST, thereby causing the relay ST to release. It will be recalled that there are two locking circuits for the relay ST, one from the relay S4 and the other from relay S2 which operated when wiper 6 of the rotary switch TS engaged contact 11 of its associated bank. The double locking circuit for the relay ST is for the purpose of insuring that the relay ST does not release until such time as the stock number has been retransmitted and the price thereof obtained from the selected indicators. These are two separate and distinct functions, either one of which may occur first, therefore, the operation of relay S2 indicates that the stock number has been completely transmitted and the stock number switches are no longer required for that purpose, and whereas the operation of relay S4 indicates that the price information of a stock whose number is stored in the stock number switches has been obtained and the stock number stored in the switches is no longer required by the transmitter.

The release of relay ST at its armature 58 removes battery from conductor 2 of cable 35 thereby releasing the relay SNR. The release of relay SNR at its armatures 43, 45 and 46 connected battery to conductors 4, 5 and 6 of cable 44 extending to the switch banks 5 of the switches HSN, TSN and USN and by way of the wipers thereof to the break contacts and armatures 255, 256 and 257 to the stepping magnets of the switches HSN, TSN and USN respectively causing these switches to operate and open their interrupter contacts, thus opening their operating circuit. The interruption of the operating circuit causes the stepping magnet to release and step their associated wipers ahead one step to another contact of the switch banks, which operation is repeated until the switches have reached terminals 12 or 25, as the case may be, which have no battery connected thereto.

When the wipers 4 of the stock number switches have been returned to normal, battery is removed from conductor 7 of cable 44, conductor 5 of cable 35, conductor 5 of cable 33, terminal 1 and wiper 5 of switch TF—00, conductor 18, make contact and armature 32 of relay CO—00 thereby causing this cut-off relay CO to release. Removal of the busy battery from terminal 1 of the banks 5 of the groups of rotary line switches TF permits the seizure of this transmitter by another dial ticker whereby a stock number may be dialed and stored therein while the transmitter is in the process of transmitting the prices obtained from the indicator of the stock Dome Mine whose stock number 123 had been previously dialed.

The operation of relay S4 at its armature 199 caused relay S3 to release. The operation of relay S4 at its armature 132 opened the operating circuit to the transmitter guard relay TG thereby to prevent the closure of this circuit by the reoperation of relay ST in response to a second dialed stock number prior to the completion of the transmission of the price information now stored in the transmitter.

The operation of relay S4 at its armature 258 caused relay PT to operate over the following circuit: Battery on ring R2 of the distributor TD, brush B1 and segment 1 of ring R1, conductor 18 of the cable 61, break contact and armature 62 of relay C4, break contact and armature 63 of relay C3, break contact and armature 64 of relay C2, break contact and armature 65 of relay C1, make contact and armature 103 of relay S1, armature 81 and break contact of relay RL1, armature 82 and break contact of relay PC, conductor 83, make contact and armature 258 of relay S4, winding of relay PT to ground. The operation of the print relay PT, causes the ticker to print the unison dot upon the tape thereby separating the stock number printed on the tape from the bid price which is about to follow.

The operation of relay PT connected ground to the conductors of cable 108 extending to one end of the windings of the coding relays C1 to C5, the circuit being continued through the coding relays C1 to C4 to the wipers 1 to 4 of the switch TS and terminals 11 thereof, and thence by way of conductors 1, 7, 13 and 19 of cable 231 to the armatures 244 of the storage relays Q1, Q7, Q13 and Q19. It will be recalled that since the first digit of the bid price is the digit 4, the relays Q7 and Q13 are operated and therefore the circuits including the conductors 7 and 13 of cable 231 are continued by way of the operated armatures 244 of relays Q7 and Q13, conductor 245, break contact and armature 246 of relay RL1 to battery. The coding relays 2 and 3 operate over the circuit just described and lock by way of their armatures 117, conductor 119 to the contacts 118 of the relay PT and thence to ground when relay PT releases.

The operation of relay PT caused relay PC to operate which, in turn, released relay PT, the release of relay PT causing the release of relay PC. The operation and release of relays PT at their armatures 86 and 105 respectively caused the stepping magnet of the switch TS to advance the wipers thereof to terminal 12, in which position the coding relays pick up the code for the units bid price when the relay PT next operates.

The release of relay PC causes its armature 82 to be disengaged from the make contact, thereby removing battery through resistance 259 from the break contact and armature 81 of relay RL1, armature 102 and make contact of relay S1 and the start magnet SM, thereby releasing the brushes B1 and B2 for rotation, during which time impulses of alternate polarity are supplied to the ticker line by way of ring R4 of the distributor to cause the ticker typewheel to move synchronously with the distributor until brush B1 engages segment 5 of ring R1. With the brushes of the distributor engaging their segments 5, battery from ring R2 is applied by way of brush B1 to segment 5 of ring R1, conductor 4 of cable 61, break contact and armature 261 of relay 5, break contact and armature 262 of relay C4, make contact and armature 263 of relay C3, make contact and armature 64 of relay C2, break contact and armature 65 of relay C1, make contact and armature 103 of relay S1, armature 102 and make contact of relay S1, and thence to the winding of the stop magnet SM, thereby energizing the stop magnet and causing the distributor to come to rest with its brushes in engagement with their segments 5.

When the brush B1 engaged segment 5, battery was applied to the relay PT to cause the digit 4 to be printed on the ticker and at this time it will be recalled the coding relays C1 to C4 are connected by way of the wipers 1, 2, 3, 4 of the switch TS to contacts 12 of their banks and thence to the armatures 244 of the bid units storage relays Q2, Q8, Q14 and Q20. It will be recalled that relay Q20 is in the operated position indicative of the character 0, and battery at the armature 244 of relay Q20 is therefore applied to conductor 20 of cable 231, contact 12 of the bank 4 and wiper of switch TS, winding of relay C4, the other side of which winding is connected by way of conductor 4 of cable 108 and make contact and armature 111 of relay PT to ground, thereby causing relay C4 to operate when the relay PT operated, the operation of relay PT at its contacts 118 releasing the coding relays C2 and C3.

As relay PC releases after having been operated by relay PT, it causes the switch TS to step its wipers to their thirteenth terminals and also releases the stop magnet of the distributor. As the brushes of the distributor travel from their segments 5 to segments 11, signals are sent to the ticker which cause the ticker typewheel to operate to the 0 position. When the distributor brushes engage their segments 11, battery is applied to segment 11 of ring R1, conductor 10 of cable 61, make contact and armature 62 of relay C4, break contact and armature 63 of relay C3, break contact and armature 64 of relay C2, break contact and armature 65 of relay C1, make contact and armature 103 of relay S1, armature 102 and make contact of relay S1 and thence to the stop magnet SM, causing the distributor to come to rest. When battery was applied to segment 11 of the ring R1 by the brush B1, relay PT operated to cause the character 0 to be printed by the ticker and also to change the setting of the code relays C1 to C5 in accordance with the storage of the bid fraction storage relays Q. It will be recalled in the example assumed that the bid fraction indicator was resting on the blank position, therefore, none of the storage relays Q3, Q9, Q15 and Q21 are operated, and none of the relays C1 to C4 are operated at this time, but relay C5 is operated for the purpose of transferring the conductors associated with segments 2 to 8 of the ring R1 from these segments to segments 22 to 28 of this ring for the transmission of fraction control signals to the ticker. With the wipers of switch TS resting on their terminals 13, a circuit is closed from battery at armature 104 and make contact of relay S1, wiper and terminal 13 of bank 5 of the switch TS, conductor 2 of cable 115, armature 114 and break contact of relay SN1, conductor 1 of cable 113, break contact and armature 112 of relay FC, winding of relay C5, conductor 5 of cable 108, make contact and grounded armature 88 of relay PT. Since no fraction is included in the bid price, the operation of relay C5 is at the present time without effect.

As relay PC releases after having been operated by relay PT it causes the wipers of the ticker sequence switch TS to step to their terminals 14, and the brushes of the distributor are released to rotate to their segments 1 thereby to position the type wheel of the ticker to print a dot since, with none of the coding relays C1 to C4 operated, a circuit is closed to the stop magnet to bring the distributor to rest with its brushes in engagement with their segments 1, this dot thus printed appearing in the fractions position of the bid price on the tape. It will be noted that contacts 14 of the switch banks 1, 2, 3 and 4 of the switch TS are unconnected, therefore with the wipers of the switch in contact with their terminals 14, none of the relays C1 to C4 are operated by the operation of relay PT. Since the code setting of relays C1 to C5 does not change at this time, it will be noted that upon release of relay PC after it has been operated by relay PT, it does not cause the release of the stop magnet SM of the distributor when the circuit from the segment 1 of the ring R1 to battery is maintained. Therefore, as relay PC releases, it reestablishes the operating circuit to the print relay PT at the break contacts of its armature 82 and the print relay PT is again operated to print a second dot on the tape, this second dot is for the purpose of separating the bid price from the ask price which is about to follow.

The operation and release of the relays PT and PC causes the ticker sequence switch TS to step to the fifteenth set of terminals and connect the coding relays C1 to C4 to the storage relays Q4, Q10, Q16 and Q22, which are set in accordance with the code for the digit 4 with the relays Q10 and Q16 operated and the relays Q4 and Q22 unoperated. When relay PT again operates ground is connected to the windings of coding relays C2 and C3 causing these relays to operate in series with the wipers 2 and 3 and their terminals 15 of the switch TS to operated armatures 244 of the storage relays Q10 and Q16 and thence by way of conductor 245 to the break contact and armature 246 of relay RL1 to battery.

The release of relay PC after having been operated by relay PT at the time of printing of the dot caused the ticker sequence switch TS to step its wipers to their terminals 16, preparatory to picking up the code from the units ask storage relays, and the distributor brush arm is moved from the segments 1 of the rings R1 and R3 and rotates until segments 5 of these rings is engaged by the brushes, at which time a circuit is completed through contacts of the coding relays C1 to C5 to the stop magnet SM and to the winding of the print relay PT, thereby arresting the distributor with the brushes in contact with segment 5 of their respective rings and causing the digit 4 to be printed on the ticker tape.

The operation of the print relay to print the digit 4 caused the coding relays C1 to C4 to be set in accordance with the code stored on the units ask storage relays Q which are connected by terminal 16 of banks 1 to 4 of the switch TS to the windings of the coding relays. Since the unit digit of the ask price, in the assumed example, is 1, the storage relays Q5 and Q11 will be operated thereby causing the coding relays C1 and C2 to be operated and locked by the relay PT.

When relay PC releases after having been operated by relay PT, it steps the wipers of the switch TS to their seventeenth terminals and also releases the brush arm of the distributor TD in order that it may rotate to segment 2. The rotation of the distributor caused signals to be transmitted to the ticker for positioning the typewheel to print the digit 1 on the tape at the time battery from segment 2 of ring R1 stops the distributor and causes the operation of relay PT. Relay PT in operating causes the coding relays to operate in accordance with the code for the digit 4 which corresponds to the fraction ½ when the relay C5 is operated. During the time the coding relays are taking their settings from the Q storage relays corresponding to the fractions portion of the ask price, relay C5 is operated over the following circuit: Ground on conductor 5 of cable 108, winding of relay C5, armature 112 and break contact of relay FC, conductor 1 of cable 113, break contact and armature 116 of relay SN1, conductor 1 of cable 115, terminal 17 and wiper 5 of the switch TS, make contact and armature 104 of relay S1 to battery.

When relay PC releases after having been operated by relay PT at the time of printing of the units digit of the ask price, the ticker sequence rotary switch TS is stepped to its terminals 18 and the distributor brush arm is released to rotate to the position 25. During this operation of the distributor signals are sent to the ticker for positioning the typewheel in accordance with the selected fractions digit. As the brush arm comes to rest on position 25, battery is connected to the winding of relay PC over a circuit including segment 25 of ring R1 and the relay PT operates to print the fraction ½ on the tape, thus completing the printing of the ask price 41½ of the stock.

With the wipers of the switch TS resting on their terminals 18, no connection is established to the windings of the coding relays which are released by the operation of the relay PT. As the relay PC releases after having been operated by relay PT at the time of printing of the fractions character ½, it causes the wipers of the switch TS to step to their nineteenth terminals and the stop arm of the distributor is again released to permit the brushes to rotate and come to rest in engagement with their segments 1. With the brushes in engagement with their segments 1 and the coding relays all released, the relay PT is operated causing a dot to be printed upon the tape. The operation of relay PT causes the relay PC to operate and in turn release the PT relay, which releases relay PC in the manner previously stated and steps the wipers of the switch TS to their terminals 20. Since the remaining terminals of banks 1 to 4 of the switch TS are unconnected, the coding relays C1 to C4 cannot again be operated during the remaining cycle of operation of the switch TS, and the distributor brushes will therefore be held arrested in contact with their segments 1 of the distributor, the PT and PC relays operating one another to cause the ticker to print a total of four dots following the last character of the ask price. The successive release of relay PC causes the wipers of the switch TS to be stepped ahead until wiper 6 of the switch TS engages terminal 22 of its switch bank, at which time a circuit is closed from battery at armature 194, and make contact of relay S1, conductor 67, wiper 6 and terminal 22 of the switch TS to the winding of relay RL1, causing relay RL1 to operate and at its armature 246 remove battery from conductor 245 extending to the storage relays Q, thus causing the operated ones of these storage relays to release.

The operation of relay RL1 at its armature 81 interrupted the operating circuit to the relay PT, thereby preventing further operation of this relay and the transmission of additional print impulses to the ticker. The operation of relay RL1 at its armature 264, closed a circuit from battery at armature 194 and make contact of relay S1, conductor 67, wiper 5 and terminal 22 of its associated switch bank, make contact and armature 264 of relay RL1, armature 265 and break contact of the stepping magnet TS and thence through the stepping magnet winding to ground. The stepping magnet TS is operated over this circuit and, as it attracts its armature 265, it interrupts its operating circuit, thereby causing it to release and advance the wipers thereof one step to their terminals 23. Since terminals 22, 23, 24 and 25 of bank 5 of the switch TS are all connected together, the switch TS is operated by self interruptions over this circuit until terminals 1 are engaged by the brushes, at which time the switch comes to rest. Relay RL1 locks by way of its armature 266 and make contact, conductor 267 in series with the winding of relay RL2, make contact and armature 63 of relay S1 to battery, the relay RL2 operating over this circuit.

The operation of relay RL2 at its armature 71 removes locking battery from conductor 1 of cable 33, thereby causing the release of relays TR—00, S1 and S4. The release of relay S4 at its armature 57 and the release of relay S1 at its armature 63 removes battery from the winding of relay RL2, thereby causing relays RL1 and RL2 to release.

A complete quotation has now been transmitted and the transmitter is in a normal position ready for the transmission of additional quotations in response to impulses dialed by the subscribers.

It will be recalled from the foregoing description that a second stock number may be dialed and stored on the stock number rotary switches during the time that the transmitter is transmitting the bid and ask prices for the previously dialed stock number. If, for example, a second stock number has been stored in the stock number rotary switches and the start relay ST operated in response to a request by a subscriber for the prices of a stock, the action of the transmitter in response to these dialed impulses is held in abeyance until the relay S4 releases at the completion of the transmission of the prices for the stock corresponding to the stock number dialed by the first subscriber. The release of the relay S4 at its armature 132, closes the circuit for the operation of the transmitter guard relay TG as an indication that a price is to be transmitted. When this occurs, the transmitter continues through its cycle of operation to cause the bid and ask prices of the second stock dialed to be printed upon the ticker tape.

While the system has been described with reference to posting the prices of any stock in dollars and fractional parts thereof, it is also adapted to post stock prices in terms of dollars and cents, the price information appearing upon the ticker tape as three digits instead of two digits followed by a fraction. The manner in which the system operates to produce this result will now be described:

The fractions cut-off relay FC shown in Fig. 3 of the drawings is provided with a low resistance operating winding and a separate winding having a high resistance for locking the relay operated. It will be recalled that the circuit for operating the relay R2 of the selected stock included the low resistance winding of the relay FC and that the current flowing through this circuit was insufficient to cause the relay FC to operate, the relay FC being marginal. If the gang relay G2 is associated with a stock having the prices thereof posted in dollars and cents, the operation of relay R2 at its contact 174, applies battery to conductor 8 of cable 153, contacts 175 of relay ST1, conductor 1 of cable 268 and thence to the grounded winding of relay E1, Fig. 5, causing relay E1 to operate. The operation of the relay E1 connects ground through a resistance 269 by way of its armature 270 and make contact to conductor 1 of cable 271, extending to a plug 272, jack 273, which is connected by way of conductor 3 of cable 168 to jack 169. The winding of the relay R2 is thus shunted by the resistance 269 and the current in the winding of the relay FC is increased sufficiently to cause the relay FC to operate, the value of the resistance 269 being sufficiently high, however, not to cause the relay R2 to release. Relay RC locks by way of its armature 274 and make contact to battery at the break contact and armature 275 of relay R2, the relay FC remaining operated over this locking circuit until the transmitter has completed its cycle of operation and returned to normal.

The operation of relay FC at its armature 112 interrupts the operating circuit for the relay C5, thereby preventing relay C5 from operating and transfering the connections from segments 2 to 8 of ring R1 to segments 22 to 28. The non-operation of coding relay C5 thus causes a digit to be posted in the fractions position on the tape. The operation of relay FC at its armature 276 applied battery to the winding of the release relay HL2 thereby to delay the release of relay RL2 until the relay FC has released.

Briefly stated, the posting of a digit instead of a fraction is accomplished by the operation of relay FC and, for each stock which is to be posted in dollars and cents, there will be a circuit including one of the conductors of cable 271 plugged into a duplicate set of jacks, whereby the operation of relay E1 for a channel 1 quotation, or E2 for a channel 2 quotation as the case may be, connects a resistance across the winding of the operated stock relay R2 to cause an increase of current through the winding of relay FC and thus operate the relay. If, on the other hand, the value of the stock was posted in fractions of a dollar, none of the conductors of cable 271 would be connected to the jack of the selected stock by a plug 272 and, although the relay E1 or E2, would be operated when relay R2 operates, the operation of relay E1 or E2 would be without effect. While, for simplification of the drawings, but a single relay E having a plurality of armatures is shown for each channel, it will be understood that in practice sufficient relays may be employed to provide contacts for grounding through a suitable resistance the windings of the gang relays R2 associated with stock indicators which post the prices thereof in dollars and cents.

If, through inadvertence or otherwise, a subscriber should dial a number which is not assigned to a stock he is apprised of this condition by the system operating to cause his ticker to print the number which he has dialed followed by four dots. A description of this feature of the system follows: There are provided a plurality of plugs 277, of which four only are shown on the drawings, connected by flexible conductors 278 to the common conductor 279 and thus to armature 281 of the relay ST1. Each of these plugs 277 is inserted into a jack 282 corresponding to an unassigned code number, whereby whenever any of the jacks 282 is selected by the subscriber by dialing an unassigned stock number, battery is applied to the selected jack 282 and one of the plugs 277 inserted therein, conductor 279, armature 281 and break contact of relay ST1, to the winding of the wrong selection relay WS1, causing WS1 to operate. The operation of relay WS1 at its armature 283 connects battery to conductor 284 and thence to armature 176 of relay SQ4. As relay SQ4 operates, battery at its armature 176 is applied to conductor 6 of cable 141, armature 178 and make contact of relay SS to the winding of relay M1, causing relay M1 to operate.

When relay SQ5 operates, a circuit is closed from battery on armature 283 and make contact of relay WS1, contacts 175 of relay ST1, make contact and armature 181 of relay SQ5, armature 182 and make contact of relay WS1, conductor 2 of cable 195, contacts 285 of relay M1, conductor 286 to the grounded winding of relay SN1, Fig. 3, thereby causing relay SN1 to operate and lock by way of its armature 287 and make contact, conductor 2 of cable 113, break contact and armature 275 of relay RL2 to battery. The operation of relay WS1 at its armature 288 applied battery to conductor 1 of cable 195, contacts 252 of relay M1, conductor 2 of cable 198 and thence to the winding of relay S4, causing relay S4 to operate and lock by way of its armature 253 and make contact, break contact and armature 71 of relay RL2 to battery.

While the foregoing operations were taking place, the transmitting distributor TD was sending the number dialed by the subscriber to the ticker, causing the ticker to print this number upon the tape under control of the switches HSN, TSN and USN. The operation of relay S4 indicated to the transmitter that the price function has been satisfied and that the transmitter could continue to operate after the number dialed by the subscriber has been transmitted to his ticker. Furthermore, the operation of relay SN1 indicated that the number dialed did not correspond to any assigned number and that the transmitter could therefore return to normal since there is no price information to transmit.

After the number has been transmitted, the transmitter sends four dots in succession, thereby stepping the ticker tape ahead four steps and causing the last digit of the number printed to be moved away from the ticker typewheel and thus be clearly legible by the subscriber. The print impulses required for this operation are caused by the operation of relays PT and PC as heretofore described, the ticker sequence switch TS being advanced one step for each cycle of operation of these relays.

When wiper 6 of the switch TS engaged its contact 14, battery was applied to conductor 288, make contact and armature 289 of relay SN1 to the winding of relay RL1, causing relay RL1 to operate and at its armature 81 prevent the transmission of additional print impulses to the ticker by interrupting the operating circuit for the PT relay. As relay RL1 operates, a circuit is closed from battery at wiper 5 of the switch TS, by way of terminals 14 to 25 of bank 5, the terminal 17 being connected to the other terminals by conductor 1 of cable 115, armature 116 and make contact of relay SN1, make contact and armature 264 of relay RL1, armature 265 and break contact of the stepping magnet TS, winding of magnet TS to ground, thereby causing the stepping magnet TS to be operated by self-interruptions until wiper 5 passes off from terminal 25 of the switch bank, thereby restoring the switch TS to its normal position with the wipers in contact with their terminals 1.

As wiper 6 of the switch TS moves from its contact 25, battery for operating relay RL1 is removed from that portion of the circuit which included the wiper 6, the relay RL1 locking by way of its armature 266 and make contact, conductor 267, in series with relay RL2, which operates to release all relays locked to its contacts, after which it releases and the transmitter is normal.

There are two wrong selection relays, relay WS1 associated with channel 1 and relay WS2 associated with channel 2. If relay ST1, Fig. 6, has been operated when the wrong selection was made, battery on conductor 279 would be applied to armature 281 and make contact of relay ST1, armature 289 and break contact of relay ST2 to the winding of relay WS2, causing relay WS2 to operate.

The operation of relay WS2 at its armature 291 applies battery to conductor 292, armature 293 of relay SQ4 and make contact thereof, conductor 5 of cable 141, armature 294 and make contact of relay SS, conductor 295 and thence to the winding of the channel 2 relay M2, causing relay M2 to operate and lock by way of its contacts 296, conductor 3 of cable 296, contacts 297 of relay ST2 to battery on the make contact and armature 291 of relay WS2. The operation of relay WS2 at its armature 299 caused relay SN1 to operate over the following circuit: Battery on armature 291 of relay WS2 and make contact thereof, contacts 297 of relay ST2, make contact and armature 301 of relay SQ5, armature 299 and make contact of relay WS2, conductor 2 of cable 296, contacts 302 of relay M2, conductor 286 and thence to the grounded winding of relay SN1. The operation of relay WS2 at its armature 303 applies battery to conductor 1 of cable 296, contact 304 of relay M2, conductor 2 of cable 198 and thence to the grounded winding of relay S4, causing relay S4 to operate and indicate to the transmitter that the price function thereof has been satisfied. The operation of both relays ST1 and ST2 of channels 1 and 2 respectively, would open the circuit to the WS relays of both channels, thereby preventing the operation of the relays WS until one or both of the ST relays had released.

The circuits at the lower part of Fig. 6 designated B1 to B9 extend to channel 2 equipment and are connected thereto in a manner identical with the corresponding circuits designated A1 to A9, the designations A1 to A8 appearing on Fig. 6, and the designation A9 appearing on Fig. 5 of the drawings.

Whenever a transmitter as, for example, transmitter TR1 is in use, a circuit is closed in part for the operation of relay OLC, Fig. 1. This circuit is traced from battery on conductor 305, Fig. 4, to conductor 4 of cable 35, armature 306 and make contact of relay ST to conductor 3 of cable 35. The conductors 4 and 3 of cable 35 may also be connected together by the operation of relay SNR at its armature 307 or the depression of the busy transmitter key BT at the contacts 308 thereof. With relays ST, SNR or the key BT operated, battery is thus applied to conductor 3 of cable 35 and thence to conductor 309, extending to armature 306 of the start relay ST of each of the other transmitters in series chain relationship whereby, whenever all of the transmitters are in use, this series circuit is completed and extends battery to conductor 311 causing the overload control relay OLC, Fig. 1, to operate, the lamp OLL to light and the overload meter OLM, Fig. 4, to operate as an indication of this condition. While the circuit for the operation of the relay OLC has been shown through the contacts of the relays ST of the transmitters TR2 to TR25, it will be understood that this is merely a graphic representation of the circuit arrangement of the transmitter TR1 and that each of the other transmitters is provided with a busy key BT and relay SN4 for additionally closing this circuit.

The operation of relay OLC at its armature 12 removes ground from conductor 13, extending by way of contacts of the relays GT0, GT1, GT2 and GT3, through cable 14 to armature 15 and windings of the stepping magnets of the switches TF, thereby preventing the operation of any of the switches TF when all of the transmitters are in use.

The operation of the busy transmitter key BT at spring 312 thereof removes battery from the in service lamp IS, thereby extinguishing the lamp as an indication that the transmitter having the operated key BT is not in service. With the key BT operated, battery at spring 312 thereof is applied to conductor 5 of cable 35, conductor 5 of cable 33 extending to a terminal of banks 5 of all the switches TF, thereby preventing any switch TF from stopping on this terminal and thereby seizing the out of service transmitter.

The foregoing description has been directed generally to the apparatus and circuits of channel 1, but it will be understood, however, that there are two channels by means of which stock prices may be obtained, both channels operating in an identical manner under control of the single group of sequence relays of Fig. 6. Whenever the indicators of a stock have been selected, the sequence relay group may be set in operation immediately to attempt the selection of another stock by another transmitter having the stock number stored therein on its switches HSN, TSN and USN. If the indicators of the next stock to be selected are within the same channel as the channel of the previously selected stock, the multiple relay M of the transmitter does not operate, and the circuit for the relay S3 is thus opened at contacts of the unoperated relay M.

With relay S3 unoperated, the relay TG is again operated after relays TG of a higher order have released, to set the sequence relays in operation, thereby to repeat the attempt to select the indicators of the desired stock. If, on the other hand, a TG relay of another transmitter should be operated, the other transmitter would take precedence and set the sequence relays in operation to make the stock selection and, if the indicators of a stock lying in the opposite channel are to be selected, the gang relay R2 would operate and set in operation the coding and pulsing equipment required for obtaining the prices therefrom during the time that the equipment from the other channel is in operation.

An interlocking circuit is provided between each channel coding relay group, and the sequence relays to prevent the false reoperation of stock indicators when the sequence switches have reached a predetermined point in their operation. The circuit operation for this feature is similar for both channels and will, therefore, be described only with reference to channel 1.

If the coding relay and sequence relay groups are both operating at the same time and the relay CR operates to release the other C relays, the operated relay R2 and relays ST1 and M1 of the transmitter, after relay SQ3 is operated, relay SQ3 causes the circuit from its armature 313 which extends from battery from break contact of armature 314 of relay SQR, to be applied by way of conductor 315 to armatures 193 and 194 of relay ST1 from whence the circuit is extended by the make contacts thereof to maintain relays ST1, R2 and M1 operated. Relay SQ3 in operating also extends battery by way of the break contact of armature 316 of relay SQR to armature 317 and make contact of relay SQ3, conductor 318, to armature 319 of relay CTR from whence it is extended by way of its make contact to the make contact and armature 247 of relay CTR, thereby holding relay CTR operated until such time as relay SQR is operated to release relay CTR and relays ST1, M1 and R2, the release of these relays occurring when armature 314 of relay SQR moves away from its break contact.

If, for any reason, a transmitter which has been seized does not complete its cycle of operation within a predetermined period of time, circuit means are provided to cause the transmitter to automatically release and restore to normal in the following manner. When relay B of the transmitter operated, battery was connected to its armature 54 and thence to one end of the winding of relay TO, the other end of this winding being connected to the make contact of the grounded armature 321 of relay TO2. The winding of relay TO2 is connected by way of conductor 3 of cable 198 to contacts 322 which operate substantially each half second and connect ground to the winding of relay TO2 over this circuit thereby causing relay TO2 to operate synchronously with the closure of the contacts 322. The operation of relay TO2 at its armature 321 connects ground to the winding of relay TO to operate relay TO, which at its make contact and armature 323 locks to ground. It will be recalled that the dial line to relay A extended through armatures 36 of relay TO and 37 of relay TO1 in parallel. The operation of relay TO, therefore, at its armature 36 interrupts this parallel connection and the circuit through the winding of relay A is now in series with the break contact and armature 37 of relay TO1.

If the transmitter has not been used by the time contacts 324 have closed, ground at the contacts is placed on conductor 4 of cable 198, causing relay TO1 to operate and at its armature 37 open the dial line thus causing the release of the holding relay H in the subscriber's ticker set and relay A in the transmitter. The release of relay A causes relay B to release and at its armature 54 release relay TO. The release of relays A and B removes busy battery from their assigned terminal on bank 5 of the rotary line switches TF, thus releasing relay CO—00 and restoring the line relay group to normal.

The release of relay A at its armature 39 and break contact applies battery to armature 49 of relay B and make contact thereof to one end of the grounded relay C, thereby causing relay C to operate until the slow releasing relay B has released. Relay C is slow releasing in order that battery at its armature 51 and make contact will be applied to the stepping magnet of the switch DS, for a sufficient length of time to cause the switch to step. The release of relay B and the subsequent release of relay C causes the stepping magnet DS to be deenergized and advance the wipers of the switch to their terminals 2 from which point the switch is advanced to its next home position, in this case, position 5 over the following circuit. Battery, armature 39 and break contact of relay A, armature 49 and break contact of relay B, strapped terminals 2, 3 and 4 of the bank 3, wiper 3, break contact and armature 325, stepping magnet DS to ground. When the switch wipers engage their terminals 5, the operating circuit to the stepping magnet is opened at terminal 5 of bank 3 and the wipers come to rest.

It will be understood that the automatic release of the transmitter just described is effective only when less than three digits have been dialed by the subscriber since the dial line is opened at armature 34 of the start relay ST upon the completion of the dialing of the third digit. When relay A releases, the stock number rotary switch corresponding to the next digit not dialed is stepped off normal. The release of relay SNR following the release of relays A and B with the start relay ST unoperated, applies battery to conductors 4, 5 and 6 of cable 44, thereby restoring to normal the stock number rotary switches.

Referring to Fig. 12 of the drawings there is shown thereon a meter 326 connected by means of a pair of flexible conductors to a plug 327. It will be recalled that the lamp R of the ticker dial set is not lighted until a transmitter has been seized although current passes through the lamp. The resistance 2 is employed to compensate for the difference in the resistances of different subscribers' line circuits and is adjusted in accordance with the reading of the meter 326 when the plug 327 is inserted into either of the line jacks A or B.

The resistance of the ticker line is adjusted by means of the variable resistance 1 to a predetermined value in accordance with the operating characteristics of the ticker. In making this adjustment, the meter 326 is plugged into either of the jacks C or D.

Whenever a subscriber presses his start key ST the guard relays of Fig. 1 operate to cause his transmitter finder TF to seek an idle transmitter and during this time one of the lamps LU0 to LU9, and one of the lamps LT0 to LT3, Fig. 1, is lighted in accordance with the particular operated guard relays associated with the subscriber's line number. These lamps remain lighted until after the transmitter finder has seized an idle transmitter at which time they are extinguished by the release of the guard relays. If, for any reason, a transmitter finder should fail to operate, no subsequent transmitter finder can operate until after the first transmitter finder has been removed from service or the trouble corrected.

When this condition occurs the identity of the transmitter finder in trouble is ascertained by the combination of lighted lamps LU and LT. If, for example, transmitter finder TF—00 should be found to be the one in trouble, the attendant inserts one of the flexible cords 329, Fig. 13, having plugs 328 on either end thereof, into jack A of the transmitter finder TF—00 and the other end of the cord 329 into jack B of another transmitter finder not regularly connected to a subscriber. A similar connection is made between jack C of transmitter finder TF—00 and jack D of the reserve transmitter finder. Whenever a plug is inserted into any of the jacks A, B, C or D, these jacks are caused to open their contacts 331 and therefore, in the example assumed, when subscriber S—00 operates his start key the reserve transmitter finder is set in operation to seize and connect his line with an idle transmitter. The insertion of a plug 328 into a line jack A causes the guard relays of Fig. 1 to be released and their associated lamps to be extinguished. When all transmitters are busy no transmitter finder can start its operation and certain lights of the group LU and LT may be lighted as an indication of a waiting call. It will be recalled, however, that when all transmitters are busy the overload lamp OLL is lighted and the attendant is thus notified that the condition preventing the operation of certain of the transmitter finders TS resulted from all transmitters being busy and not from a trouble condition and, when this condition is present the attendant would not remove any of the transmitter finders from service by the use of the patching cords 329.

Figure 8:
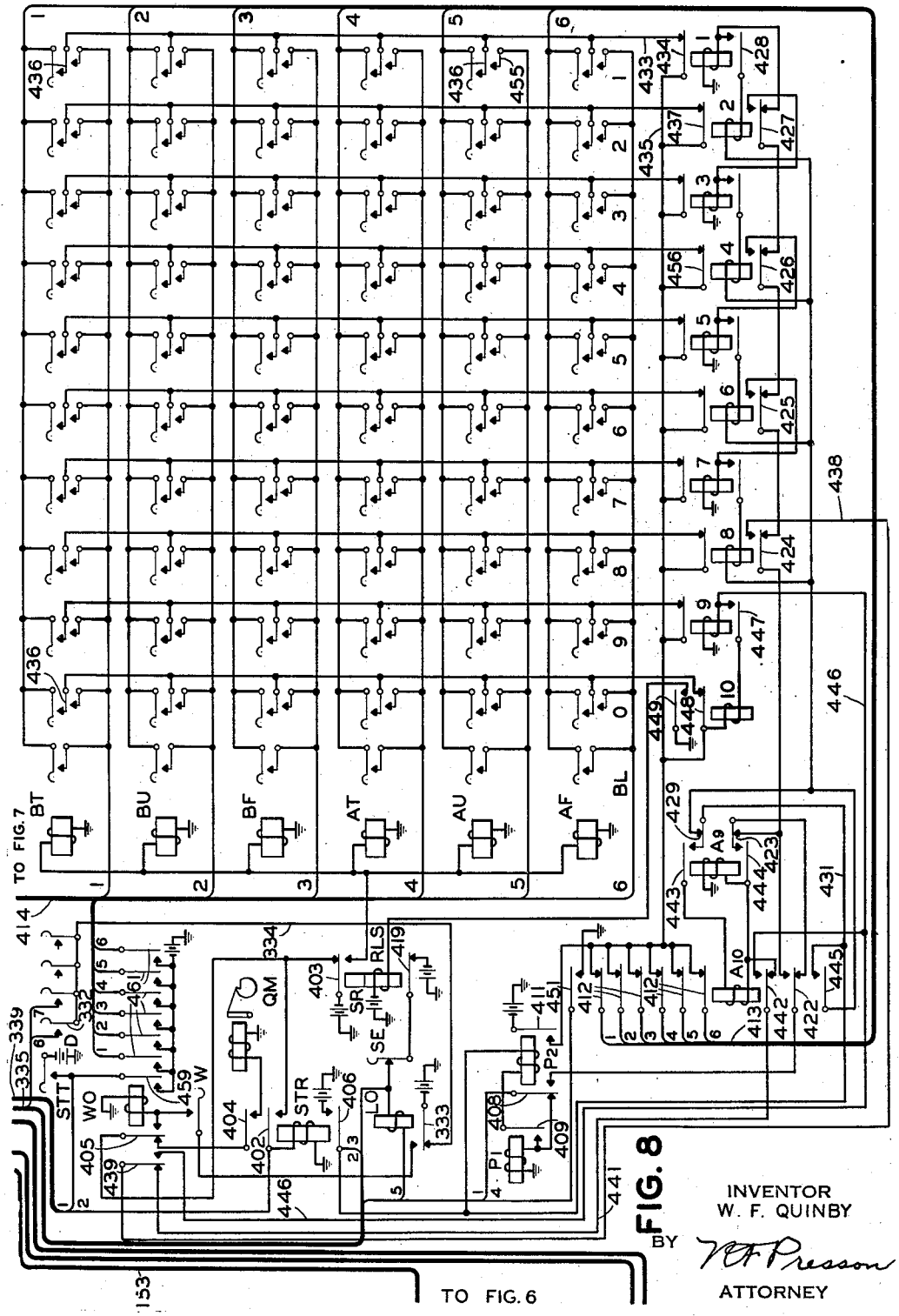

The manner in which the indicators associated with the check panels and the indicators of the post panels are set by the operators in accordance with the bid and ask prices of the stock will now be described. Referring to Fig. 8 of the drawings there is shown thereon a keyset comprising a group of stock selection keys and a group of numerical keys, the group of numerical keys preferably being divided into subgroups, there being one such subgroup for each of the bid tens, bid units, bid fractions, ask tens, ask units and ask fractions denomination of the price. Each of the subgroups includes the keys BL, 0 and 1 to 9. The keys of each subgroup are arranged to be held in their operated position until their associated key release magnet is operated. In the embodiment shown on the drawings all of the release magnets BT, BU, BF, AT, AU and AF are connected in parallel and operated whenever the relay RLS operates, thereby releasing the operated keys of the numerical group of keys.

In the example cited it was assumed that the indicators of the stock Dome Mine were set to post a bid price of 40 and an ask price of 41½. The keyset operations necessary to post these settings are as follows: The operator depresses the keys 4, 0 and BL in the rows BT, BU and BF respectively and the keys 4, 1 and 4 in the rows AT, AU and AF respectively to set up a bid price of 40 and an ask price of 41½. The key D of the selection keys 332 is momentarily depressed to select the stock Dome Mine, after which the start transmission key STT is depressed. The operation of the key D connects battery from the armature 333 and break contact of relay LO, conductor 334, operated contacts of the key D, conductor 6 of cable 335, conductor 336, break contact 337 of relay R2 to the winding of relay R1, thereby causing relay R1 to operate and lock by way of its contact 338 to battery on conductor 336. It will be noted that relay R1 can operate only when relay R2 is released and the contacts 337 thereof are closed. Similarly, relay R2 can operate only when relay R1 is released and its contacts 172 are closed. This interlock circuit between the relays R1 and R2 provides an arrangement whereby the stock indicators may be selected by a subscriber only when the stock has not been selected by an operator and vice versa. The operation of the start key STT connects battery to conductor 1 of cable 339, operated contacts 401 of relay R1, conductor 2 of cable 339 and thence to the winding of the start relay STR, causing the relay STR to operate and lock by way of its armature 402 and make contact to battery on the break contact and armature 403 of relay RLS. The operation of relay STR at its armature 404, closes a circuit from the grounded winding of the quotation meter QM, make contact and armature 404 of relay STR, break contact and armature 405 of relay WO to battery on the break contact and armature 403 of relay RLS. The operation of relay STR connects battery at its make contact and armature 406, conductor 2 of cable 335, interrupter contacts 407, conductor 1 of cable 335, armature 408 and break contact of relay P2 and thence to the grounded winding of relay P1, thereby causing relay P1 to operate. The operation of relay P1 at its armature 409 connects battery to one side of the winding of relay P2, the other side of which winding is connected to battery at armature 406 of relay STR. When the interrupter contacts 407 are opened, relay P1 locks in series with the winding of relay P2 to battery at the armature 406 of the relay STR causing relay P2 to operate over this circuit. The operation of relay P2 at its armature 411 connects battery by way of break contacts and armatures 412 of relay A10 to conductors 1 to 6 of cable 413, extending to each of the numerical and blank keys of the keyset, from whence the circuit is continued through the operated ones of the keys to the conductors 1 to 6 of cable 414 extending to the interrupter springs 415. When these springs engage their contacts, battery is applied to conductors 1 to 6 of cable 416 extending to contacts 417 of relay R3 and contacts 418 of relay R1 from whence the circuit is traced through relay R1 to conductors 7 to 12 of cable 222 extending to the windings of the checkboard indicators of the stock Dome Mine, and thence by way of their switching mechanisms 223 to the grounded conductor 224.

When battery was placed on conductor 6 of cable 335 by the operation of the selection key D, relay R3 associated with the stock Dome Mine at the post panel was caused to operate and, at its contacts 418, lock by way of conductor 5 of cable 335, winding of relay LO, contacts of the selection elimination key SE to battery at the break contact and armature 419 of relay RLS, the relay LO operating in series with the winding of relay R3 when the selection key D opened its contacts. The operation of relay LO at its armature 333 removed battery from conductor 334 extending to the springs of the selection keys 332, thereby rendering the operation of these keys ineffective until after relay LO has released.

With relay R3 operated, the circuit from the impulse springs 415 through cable 416 is continued through contacts 417 of relay R3 to conductors 1 to 6 of cable 421 and thence through the windings of the bid and ask indicators of the post panel and their switching mechanisms 223 to the grounded conductor 224. Each time the impulse springs 415 engage their contacts, battery is thus applied to the indicators of the post panels and the checkboard causing these indicators to be advanced step-by-step until they have reached their normal or blank position, at which time the switching mechanism 223 of these indicators is disengaged from their grounded conductors 224, thereby causing the indicators to come to rest on their blank position until the tenth impulse thereto has been received.

The operation of relay P2 at its armature 408 closed a circuit from battery on armature 406 of relay STR, conductor 2 of cable 335, contacts 407 of the impulse machine, conductor 1 of cable 335, armature 408 and make contact of relay P2, armature 422 and break contact of relay A10, contact 423 of relay A9, armature 424 and break contact of relay 8, armature 425 and break contact of relay 6, armature 426 and break contact of relay 4, armature 427 and break contact of relay 2 to the winding of relay 1, thereby causing relay 1 to operate when the interrupter closes its contacts 407.

When armature 428 of relay 1 engages its make contact, battery is applied to one end of the winding of relay 2, the other end of which is connected by way of contact 429 of relay A9, conductor 431 to battery on armature 406 of relay STR. When the interrupter contacts 407 open, battery is removed from armature 428 of relay 1 and relay 1 locks in series with the winding of relay 2, causing relay 2 to operate. The operation of relay 1 at its armature 434 removes battery from conductor 433 extending to the springs 436 of the keys 1 of each of the subgroups of keys. In a similar manner relay 2 at its armature 437 removes battery from the springs 438 of the digit keys 2.

The operation of relay 2 at its armature 437 transferred the pulsing circuit from the winding of relay 1 to the winding of relay 3, thereby causing relay 3 to operate when the impulser again closes its contacts 407. When contact 407 of the impulser again opened, relay 4 operates in series with relay 3 and at its armature 426 transfers the pulsing circuit to the relay 5. As the third impulse is received relays 5 and 6 operate and relays 7 and 8 operate as the fourth impulse is received, all of the relays 1 to 8 being locked to battery on conductor 431 under control of the contacts 429 of the relay A9.

When relay 8 moves its armature 424 into engagement with the make contact thereof, the impulsing circuit is transferred to conductor 438, armature 439 and break contact of relay WO, conductor 441, armature 442 and break contact of relay A10 to the grounded winding of relay A9, causing relay A9 to operate when the fifth impulse is received and at its contacts 429 release the relays 1 to 8. When the impulse contacts 407 open, relay A10 operates in series with relay A9 and armature 443 and make contact of relay A9 to battery on conductor 431. As the armature 444 of relay A9 operated, contacts 423 were caused to be opened, thereby opening the circuit to the winding of relay A9, but the engagement of armature 444 with its make contact closed a circuit in series with the break contact and armature 422 of relay A10 before the contacts 423 opened, thereby maintaining the operating circuit to the relay A9 closed until after armature 443 of relay A9 has engaged its make contact and established a locking circuit for the relay A9, which is effective after the interrupter contacts 407 opened.

The operation of relay A10, at its armature 422 closed the pulsing circuit from the interrupter contacts 407 to armature 424 and break contact of relay 8, armature 425 and break contact of relay 6, armature 426 and break contact of relay 4, armature 427 and break contact of relay 2 to the winding of relay 1, thereby causing relay 1 to reoperate when the impulse contacts 407 are again closed. The operation of relay A10 at its armature 445 completed a circuit from battery on armature 406 of relay STR to the windings of the relays 2, 4, 6 and 8.

As the sixth impulse terminated, relay 2 operated in series with relay 1 to battery at armature 406 of relay ST over the circuit just described. The seventh impulse operates relays 3 and 4, the eighth, relays 5 and 6 and the ninth impulse the relays 7 and 8. With relay 8 operated the pulsing circuit at its armature 424 is continued from the make contact thereof by way of conductor 438, armature 439 and break contact of relay WO, 441, armature 442 and make contact of relay 10, conductor 446 extending to the winding of relay 9, thereby causing relay 9 to operate as the tenth impulse is received. As armature 447 of relay 9 engages its make contact, battery is applied to one end of the winding of relay 10, the other end of this winding being connected by way of the make contact and armature 411 of relay P2 to battery. As the contacts 407 are opened at the termination of the tenth impulse, the relay 10 operates in series with relay 9, and at its armature 448 removes battery from the springs 436 of the 0 numerical keys. The operation of relay 10 at its armature 449 connected ground to the winding of relay RLS, causing the relay RLS to operate.

For each operation of the contacts 407, the contact springs 415 of the impulse machine closed their contacts twice. During the time the first five impulses were sent to the counting chain by the interrupter contacts 407 to operate the relays 1 to 8, A9 and A10, ten impulses were transmitted by the contact springs 415 of the interrupter to the indicators of the selected stock in the checkboard and in the post panels regardless of the setting of the numerical keys, except that a key in each of the subgroups of keys must be depressed to cause these impulses to be transmitted to the selected indicator corresponding thereto.

At the completion of the fifth impulse to the counting chain, relay A10 operates and at its armature 451 connects ground to conductor 4 of cable 335, conductor 452, operated contacts 453 of relay R1, conductors 1 to 6 of cable 222, contacts 225 of the switching mechanism 223 of each of the selected indicators of the checkboard and thence to the windings of these indicators. Similarly, ground at conductor 4 of cable 335 is extended through operated contacts 454 of the relay R3, conductor 7 of the cable 421, operated contacts 225 and the switching mechanism 223 of each of the selected indicators of the post panel and thence to the windings of these indicators, all of the selected indicators now being in their blank positions.

Since the indicators of the selected stock in the post panel and checkboard operate in parallel, for the sake of clearness reference will now be made only to the operation of the indicators of the checkboard.

Between the time of operation of relay A10 at the termination of the fifth impulse to the counting chain and at the beginning of the sixth impulse to the counting chain causing the operation of relay 1, the impulse springs 415 of the impulse machine operate to send an impulse to the selected indicators. For example, the circuit to the AU indicator is as follows: Battery at armature 411 and make contact of relay P2, conductor 435, armature 434 and break contact of relay 1, conductor 433, contacts 436 and 455 of the numerical key 1 of the groups AU, conductor 5 of cable 414, operated contacts of the impulse machine, conductor 5 of cable 416, operated contact of relay R1, conductor 11 of cable 222, winding of indicator unit AU of the checkboard, operated contacts 225, conductor 5 of cable 222, operated contacts of the relay R1, conductor 452, conductor 4 of cable 335, armature 451 and make contact of relay A10 to ground. Each of the other indicators, with the exception of the bid fractions indicator, is operated concurrently with the AU indicators and over a circuit including operated keys of the keyset and break contacts of their respective relays, whereby all of the indicators of the associated stock are stepped to their positions 1 at the time the sixth impulse to the counting chain is received.

The operation of relay 1 in response to the sixth impulse at its armature 434 interrupts the circuit to the springs 436 of the keys 1 of the keyboard, of which, in the example assumed, only the key AU1 is operated. The operation of relay 1 therefore prevents more than one impulse being sent to the indicator unit AU after it has passed through the normal position and the indicator AU is thus set to display the digit 1.

While the sixth impulse to the counting chain is being received, the second impulse is transmitted by the springs 415 of the impulse machine to the selected indicators BT, BU, AT and AF, thereby stepping these indicators to their positions 2. At the termination of the sixth impulse the operation of relay 2 at its armature 437 interrupts the circuit to the springs 436 of the digit key 2 of the keyset and a third impulse is sent to the indicators. When the seventh impulse is received by the counting chain, relay 3 operates and opens the circuit to the digit keys 3 and a fourth impulse is sent to the indicators. When the seventh pulse terminates, relay 4 operates and at its armature 456 interrupts the circuit to the keys BT4, AT4 and AF4, thereby causing the indicators BT, AT and AF to display the digit four, four, and one-half respectively.

When relay 8 operates at the termination of the ninth impulse to the counting chain, eight impulses will have been sent to the indicator BU and the pulsing circuit to the counting chain will be switched by the operation of armature 424 of relay 8 to conductor 438, armature 439 and break contact of relay WO, conductor 441, armature 442 and make contact of relay A10, conductor 446 and thence to the winding of relay 9, causing relay 9 to operate and interrupt the circuit to the springs 436 of the digit keys 9, the indicator having by this time been stepped to position 9. The bid tens indicator now receives a tenth impulse over a circuit including operated contact 436 of the digit key BU0 and armature 448 and break contact of relay 10 causing this indicator to be stepped ahead to display the digit 0. When the tenth impulse to the counting chain terminates, relay 10 operates and at its armature 449 interrupts the aforesaid circuit to the bid tens indicator, thereby causing it to come to rest to display the digit 0.

The operation of relay 10, as heretofore stated, at its armature 449 causes the operation of relay RLS. As armature 403 of relay RLS moves away from its break contact, battery is removed from armature 402 of relay STR, thereby causing relay STR to release. The operation of armature 403 also removes battery from armature 405 and break contact of relay WO, armature 404 and make contact of relay STR and thence to the quotation meter QM. When armature 403 engages its make contact, battery is applied to the windings of the release magnets BT, BU, BF, AT, AU and AF, thereby causing these magnets to operate and release the operated keys of the keyset. The operation of armature 419 of relay RLS removes battery from the windings of relays LO, RL and R3, thereby causing these relays to release. The release of relay LO at its armature 333 connects battery to the selection keys 332, thereby to render these keys effective to make another stock selection by the operator. The release of the start relay STR at its armature 406 removes battery from the windings of relays P2 and P1 causing them to release and release the counting chain relays.

When relay R1 operated in response to the operation of the selection key D for the stock Dome Mine, a circuit was closed from ground at the operated contact 457 of relay R1 through the lamp 458, conductor 3 of cable 335, contacts of the key SE to battery on armature 419 of relay RLS, thereby causing the lamp 458 to light as an indication to the operator that a selection has been effected. When relay RLS operates, the lamp 458 is extinguished, thereby indicating to the operator that another stock may be selected.

When it is desired to restore all of the indicators of any stock to their blank positions, the stock selection key 332 is operated to select the indicators of the stock for operation and the wipe-out key W is depressed. When the key W is depressed, battery from the operated armature 333 of relay LO is connected by way of its make contact to the key W and thence to the winding of relay WO, causing relay WO to operate, the relay LO having operated in series with the locking circuit of the selected stock relay R3. Relay WO locks by way of its armature 405 and make contact thereof to the break contact and armature 403 of relay RLS and thence to battery. The operation of the start key STT may be omitted as relay WO at its armature 459 applies battery to conductor 1 of cable 339 in a manner identical with the operation of the key STT.

The operation of relay WO at its armature 461 applies battery to conductors 1 to 6 of cable 414, through the interrupter springs 415 of the impulse machine and thence to conductors 1 to 6 of cable 416, through operated contacts of relays R1 and R3 to the windings of the selected indicators BT, BU, BF, AT, AU and AF, from whence the circuit is continued by way of conductor 224 to ground.

When relay 8 of the counting chain operates, it transfers the pulsing path at its armature 424 to armature 439 of relay WO and make contact thereof, and thence by way of conductor 446 to the winding of counting relay 9. The operation of relay 10 occurs after ten impulses have been sent to the indicators and causes the operation of relay RLS to release the equipment, the release of relay LO at its armature 333 causing the relay WO to release. It will be noted that during the wipe-out of the indicators, relays A9 and A10 were unoperated and therefore, battery was not connected to the contacts 225 of the indicators, thereby causing each indicator to come to rest at its blank position when sufficient impulses had been received to cause the switching mechanism 223 to be disengaged from the grounded conductor 224.

If the operator should make an error in operating the stock selection keys 332, the error may be corrected by operating the stock error key SE. The operation of the key SE removes battery from the locking circuit of the relays R1, R3 and LO causing these relays to release. The release of relay LO at its armature 333 connects battery to the selection keys 332, thereby enabling a new selection to be made.

While the invention has been described in detail with respect to a particular preferred example thereof, which give satisfactory results, it will be understood by those skilled in the art that various changes and modifications may be made without departing from the spirit and scope of the invention, and it is intended therefore in the appended claims to cover all such changes and modifications.

What is claimed as new and desired to be secured by Letters Patent is:

1. In an apparatus of the character described, the combination of subscribers' equipments each including a dial key, a dial and a telegraph printer for respectively displaying stock designations and prices of stocks, a central operating station including a plurality of groups of indicators for displaying prices in reference to various stocks, stock selecting relays, means operated by the subscriber's key and the dial for connecting the subscriber's line to the central operating station and for operating the stock selecting relay corresponding to the stock designation characters dialed, means in the central operating station under control of the operated stock selecting relay and the selected price indicators for recording the prices on the printer after the indicators have been selected, and additional means in the central operating station for causing the printer to print characteristic symbols representative of a stock designation not assigned to the groups of indicators when such a selection has been effected by the operation of the subscriber's dial.

2. In an apparatus comprising an indicator which is rotatable and has a normal position and a plurality of moved positions, means for rotating said indicator through a complete revolution, means including relays operable under control of the operation of said indicator during its movement from normal to the previous set-up position as it is being given a complete rotation, for setting up a signal in permutation code in accordance with the previous set-up position of the indicator, a printing mechanism having a type wheel actuable directly from one printing position to another printing position by printer operating signals, an outgoing line connected to said printing mechanism, and transmitting means operatively connected to said signal means for translating the permutation code signal set up therein into printer operating signals and for transmitting said signals over said outgoing line to cause the printing mechanism to print the character representative of the position of the indicator.

3. In a system of the character described, the combination of a plurality of subscribers' equipments each including a manipulative impulse transmitting device and a telegraph printer, a central information bureau comprising a large number of groups of indicators corresponding to various stock or commodities, an operator's keyboard, selecting mechanism responsive to impulses received from said manipulative device of any of the subscribers' equipments for operating the indicators of said stocks or commodities, means in a central station controlled by said operated indicators for storing signals representative of the settings of said indicators, a transmitting mechanism for sending impulses to the subscriber's equipment comprising stock designation and price signals in accordance with the stored settings of the operated indicators set up by said operator's keyboard, and means in the central station effective when impulses not corresponding to any of the stocks or commodities are received from said manipulative means for causing the transmitting mechanism to send a characteristic signal representative of this condition to the telegraph printer of the subscriber's equipment.

4. In an apparatus of the character described, the combination of subscribers' equipments each including a dial key, a dial and a printing mechanism for respectively displaying stock designations and prices of stocks, a central operating station including a plurality of groups of indicators for displaying prices in reference to various stocks, stock selecting relays, means operated by the subscriber's key and the dial for connecting the subscriber's line to the central operating station and for operating the stock selecting relay corresponding to the characters dialed, a plurality of channels of communication in said central station respectively associated with certain of said groups of indicators, means for selecting one of said channels for operation in accordance with the stock designation dialed, and means in the central operating station under control of the selected stock relay and channel for causing the printing mechanism to print the price of the stock in reference to which a call is made.

5. In a system for disseminating information regarding a stock or other item, the combination of a plurality of subscribers' equipments, each including an impulse mechanism and a printing device having a type wheel actuatable directly from one printing position to another printing position by printer operating signals, said type wheel being resettable to an initial starting position by synchronizing signals transmitted to the printing device, a central information bureau, a pair of line wires intermediate each subscriber's equipment and said central information bureau, storage means at said information bureau operable in accordance with impulses from the subscriber's impulse mechanism received over one of the said line wires to store the designation of the item, synchronizing means, and a transmitting mechanism including a distributor at the central information bureau controlled by said synchronizing means and said storage means for transmitting synchronizing signals and printer operating signals over the other of the line wires to cause the subscriber's printing device to be brought into synchronism with said distributor and thereafter to print the designation of the desired item.

6. In an apparatus of the character described, the combination of subscribers' equipments, each including a dial key, a dial and a printer for respectively displaying stock designations and prices of stocks, said printer having a type wheel actuatable directly from one printing position to another printing position by printer operating signals and actuatable by synchronizing signals to an initial starting position, a central operating station including transmitting means and a plurality of groups of indicators for displaying prices in reference to various stocks, stock selecting apparatus including a plurality of storage switches, means operated by the subscriber's key and the dial for connecting the subscriber's line to the central operating station and for operating the storage switches in accordance with the characters dialed, synchronizing means, means in the central operating station under control of said synchronizing means and the storage switches for transmitting synchronizing signals and printer operating signals to cause the printer to be brought into synchronism with said transmitting means and to print the designation of the stock in reference to which a call is made, and means under control of the selected price indicators for transmitting printer operating signals to cause the printer to print the prices set up on said selected price indicators, said last mentioned means including a plurality of groups of storage relays set up under control of the selected indicators, a switching mechanism and a group of coding relays operable under control of said switching mechanism and said storage relays.

7. In a system of the character described, the combination of subscribers' equipments each including manipulative means and a printing device for respectively displaying stock designations and prices of stocks, a plurality of subscribers' lines, a central operating station including a plurality of channels of communication each comprising a plurality of groups of indicators for displaying prices in reference to various stocks, stock selecting apparatus including a plurality of storage means, means operated by the subscriber's manipulative means for connecting the subscriber's line to the central operating station and for operating the storage means in accordance with the stock designation dialed, means controlled by said storage means for selecting one of said channels of communication, means for operating a group of indicators selected by the stock selecting apparatus over the selected channel, means in the central operating station under control of the selected indicators for causing the printing device to post the designation of the stock in reference to which a call is made and means under control of the price indicators for causing the printer to print the prices set up on the selected price indicators.

8. In an automatic posting system for stocks or other items which fluctuate in value, the combination of a subscriber's equipment comprising a manually operable dial set for generating item selection impulses and a single printing mechanism adapted to print successively each of the characters when received representative of the value of any of said items, a central transmitting station including a plurality of item information indicating devices each settable in accordance with the value of the item represented thereby, storage devices, a communication circuit interconnecting said subscriber's equipment and said central station, means responsive to the item selection impulses generated by the subscriber's dial set for selecting any desired one of said indicating devices and for connecting one of said storage devices thereto, means responsive thereafter and including said storage device for automatically transmitting to the calling subscriber's equipment character printing impulses comprising the stored information in regard to the desired item, and means at the subscriber's equipment for causing said single printing mechanism to print successively each of the characters when received.

9. In an automatic posting system for stocks or other items which fluctuate in value, the combination of a subscriber's equipment comprising a manually operable dial means for generating item selection impulses and a single printing mechanism adapted to print successively each of the characters when received representative of the item designation and value of any of said items, a central transmitting station including a plurality of item information storage devices each settable in accordance with the value of the item represented thereby, a communication circuit interconnecting said subscriber's equipment and said central station, means responsive to the item selection impulses generated by the subscriber's manually operable means for selecting any desired one of said storage devices, means responsive to said selection for automatically transmitting to the calling subscriber's equipment character printing impulses comprising the item designation and the stored information in regard to the desired item, and means at the subscriber's equipment for causing said single printing mechanism to print successively each of the item designation and item information characters when received.

10. In an apparatus of the character described, the combination of a plurality of subscribers' equipments each including a printing mechanism and manipulative means for setting up the characters designating an item in reference to which price information is desired, a central operating station including a plurality of groups of indicators on which information as to various items is displayed, means responsive to the operation of said manipulative means in the subscriber's equipment for selecting one of said groups of indicators in the central operating station, storage means comprising a plurality of relays for storing the settings of the selected indicators, means controlled by said storage means for transmitting a series of impulses to cause the printing mechanism to post the character designating the item information desired, and additional means including a rotary switch to cause the printing mechanism to print a predetermined number of characters following certain of the item price information.

11. The combination of a plurality of subscribers' equipments each including manipulative means and a telegraph printer having a type wheel actuatable directly from one printing position to another printing position by printer operating impulses, a central operating station including a plurality of groups of stock price indicators, stock designation storage means, a switching mechanism for operatively connecting said stock designation storage means successively to said manipulative means to store the stock designation, stock selection relays selectively operable under control of said stock selection storage means for selecting any group of indicators, groups of storage relays operable under control of said stock price indicators, a rotary switch, and transmitting mechanism under control of said stock designation storage means, said rotary switch and the storage relays for causing printer operating impulses to be transmitted for actuating the type wheel of said printer to cause the latter to print the stock designation and prices set up on the selected stock price indicators.

12. In an apparatus of the character described, the combination of a central information station comprising a plurality of groups of settable devices upon which information may be stored as to different items, a subscriber's equipment including manipulative means and a device for printing information as to any desired item stored at the central station, an automatic sender at the central station, said sender including a selector, a plurality of storage devices controlled by said manipulative means, means in the subscriber's equipment for transmitting impulses corresponding to the designation of any desired item stored at the central station, means responsive to said impulses for connecting the subscriber's printing device to the automatic sender and for operating said selector, means operable under control of said selector for selecting a group of devices corresponding to said item designation, means for setting said sender in operation under control of said storage devices and said group of devices selected by said selector for causing said printing device to print the item designation and characters representative of the selected group of devices respectively, a second subscriber's equipment including manipulative means and a printing mechanism, and means in the central station effective immediately when the item designation has been printed on the first subscriber's printing device for storing the item designation under control of the manipulative means of said second subscriber's equipment thereby to control the operation of the second subscriber's printing mechanism by said automatic sender.

13. In a system of the character described, the combination of subscribers' equipments each including manipulative means and a printer, an outgoing line, a central station including a distributor and a plurality of storage devices, starting means controlled by said manipulative means for setting the distributor in operation to transmit impulses over said outgoing line to the printer in accordance with the storage of the storage devices, said starting means including a variable resistance element for reducing the current through the distributor starting means in accordance with the time said starting means are in closed circuit condition, and means for closing said circuit.

14. In an apparatus of the character described, the combination of a plurality of subscriber's equipments each including a subscriber's key mechanism for setting up a number designating an item and a printing mechanism, a central operating station including a plurality of selectors each of which comprises means for storing the item number dialed by the subscriber, means operated upon depression of the subscriber's key for connecting the subscriber's equipment to one of said selectors, means operated as the last digit of the item number is set up in the item storage means for operating a selector, a first group of indicators at the central station for posting the values of items represented thereby in integers and fractions, a second group of indicators for posting values of items in integers and decimals, a plurality of groups of storage relays, means operated by said selector for connecting either group of indicators to the storage relays in accordance with the item designation set up by the subscriber's key mechanism, means for operating the selected indicators to transfer their settings to the groups of storage relays, a distributor for operating said printing mechanism in the subscriber's equipment to post an item designation number and the prices of the selected item under control of the item number storage devices and the selected group of indicators respectively.

WILLIAM F. QUINBY.